United States Patent
Kotoku

(10) Patent No.: US 9,950,570 B2
(45) Date of Patent: Apr. 24, 2018

(54) PNEUMATIC TIRE

(71) Applicant: The Yokohama Rubber Co., LTD., Minato-ku, Tokyo (JP)

(72) Inventor: Koichi Kotoku, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 334 days.

(21) Appl. No.: 14/655,881

(22) PCT Filed: Dec. 28, 2012

(86) PCT No.: PCT/JP2012/084211
§ 371 (c)(1),
(2) Date: Jun. 26, 2015

(87) PCT Pub. No.: WO2014/103062
PCT Pub. Date: Jul. 3, 2014

(65) Prior Publication Data
US 2015/0321515 A1    Nov. 12, 2015

(51) Int. Cl.
*B60C 11/01*    (2006.01)
*B60C 9/18*    (2006.01)
(Continued)

(52) U.S. Cl.
CPC .................. *B60C 9/18* (2013.01); *B60C 5/00* (2013.01); *B60C 9/0007* (2013.01); *B60C 9/04* (2013.01);
(Continued)

(58) Field of Classification Search
CPC .............................. B60C 11/0083; B60C 11/01
See application file for complete search history.

(56) References Cited

U.S. PATENT DOCUMENTS 3,939,890 A * 2/1976 Abe .................. B60C 11/00
152/209.13
5,211,781 A * 5/1993 Adam ................ B60C 11/0306
152/209.25
(Continued)

FOREIGN PATENT DOCUMENTS

JP        62-152902      *  7/1987
JP        03-099903      *  4/1991
(Continued)

OTHER PUBLICATIONS

English machine translation of JP2001039118, no date.*
(Continued)

*Primary Examiner* — Robert C Dye
(74) *Attorney, Agent, or Firm* — Thorpe North & Western

(57) ABSTRACT

A pneumatic tire includes at least three circumferential main grooves that extend in the tire circumferential direction, and land portions that are partitioned and formed by these circumferential main grooves. In addition, a belt layer is formed by laminating a pair of cross belts each having a belt angle of not less than 10° and not more than 45° as an absolute value and having mutually opposite signs, and a circumferential reinforcing layer having a belt angle within a range of ±5° with respect to the tire circumferential direction. In addition, in a cross-sectional view taken along the tire meridian direction, a diameter D1 at a point at an edge portion on the inner side of a shoulder land portion in the tire width direction and a diameter D2 at a predetermined point within the ground-contact surface of the shoulder land portion have a relationship such that D2<D1.

28 Claims, 16 Drawing Sheets

(51) Int. Cl.
*B60C 5/00* (2006.01)
*B60C 9/00* (2006.01)
*B60C 9/04* (2006.01)
*B60C 9/20* (2006.01)
*B60C 9/28* (2006.01)
*B60C 11/00* (2006.01)

(52) U.S. Cl.
CPC .............. *B60C 9/2006* (2013.01); *B60C 9/28* (2013.01); *B60C 11/01* (2013.01); *B60C 2011/0033* (2013.01); *B60C 2011/013* (2013.01); *B60C 2200/06* (2013.01)

(56) References Cited

U.S. PATENT DOCUMENTS

| | | | |
|---|---|---|---|
| 5,616,195 | A | 4/1997 | Marquet et al. |
| 6,082,424 | A | 7/2000 | Miyazaki |
| 6,401,778 | B1 | 6/2002 | Cluzel |
| 2004/0026000 | A1* | 2/2004 | Shimizu ............... B60C 9/20 152/527 |
| 2004/0069392 | A1* | 4/2004 | Maruoka ............... B60C 3/04 152/454 |
| 2006/0169380 | A1 | 8/2006 | Radulescu et al. |
| 2006/0169381 | A1* | 8/2006 | Radulescu ............ B60C 9/2006 152/531 |
| 2006/0169383 | A1 | 8/2006 | Radulescu et al. |
| 2008/0000566 | A1* | 1/2008 | Manno ................ B60C 9/2006 152/527 |
| 2009/0229722 | A1* | 9/2009 | Isobe ................... B60C 9/2006 152/209.18 |
| 2009/0277552 | A1* | 11/2009 | Maruyama ............ B60C 3/04 152/454 |
| 2009/0277557 | A1 | 11/2009 | Suzuki et al. |
| 2010/0116402 | A1 | 5/2010 | Isobe |
| 2011/0192513 | A1 | 8/2011 | Hamada |
| 2011/0220259 | A1 | 9/2011 | Suzuki et al. |
| 2012/0097307 | A1 | 4/2012 | Delebecq et al. |
| 2014/0305566 | A1 | 10/2014 | Mashiyama |
| 2014/0326380 | A1 | 11/2014 | Kotoku |

FOREIGN PATENT DOCUMENTS

| | | | |
|---|---|---|---|
| JP | H03-99903 | | 4/1991 |
| JP | H04-66304 | | 3/1992 |
| JP | H10-0315712 | | 12/1998 |
| JP | H11-512050 | | 10/1999 |
| JP | 2001-039118 | | 2/2001 |
| JP | 2001039118 | * | 2/2001 |
| JP | 2001-301425 | | 10/2001 |
| JP | 2002-103916 | * | 4/2002 |
| JP | 2002-144818 | | 5/2002 |
| JP | 2005-125893 | | 5/2005 |
| JP | 2006-021702 | | 1/2006 |
| JP | 4008013 | | 11/2007 |
| JP | 2008-001264 | | 1/2008 |
| JP | 2009-073337 | | 4/2009 |
| JP | 4354114 | | 10/2009 |
| JP | 2010-149842 | | 7/2010 |
| JP | 4642760 | | 3/2011 |
| JP | 4663638 | | 4/2011 |
| JP | 4663639 | | 4/2011 |
| JP | 2011-161988 | | 8/2011 |
| JP | 4918948 | | 4/2012 |
| JP | 4984013 | | 7/2012 |
| JP | 2012-522686 | | 9/2012 |
| JP | 5029787 | * | 9/2012 |
| WO | WO 1997/07996 | | 3/1997 |
| WO | WO 1999/024269 | | 5/1999 |
| WO | WO 2005/016666 | | 2/2005 |
| WO | WO 2005/016667 | | 2/2005 |
| WO | WO 2005/016668 | | 2/2005 |
| WO | WO 2007/148447 | | 12/2007 |
| WO | WO 2009/037891 | | 3/2009 |
| WO | WO 2010/058857 | | 5/2010 |
| WO | WO 2010/115891 | | 10/2010 |
| WO | WO 2013/042255 | | 3/2013 |
| WO | WO 2013/042256 | | 3/2013 |

OTHER PUBLICATIONS

English machine translation of JP03-099903, no date.*
English machine translation of JP62-152902, no date.*
English machine translation of JP2002-103916, no date.*
International Search Report for International Application No. PCT/JP2012/084211 dated Apr. 9, 2013, 4 pages, Japan.

* cited by examiner

COMPARATIVE EXAMPLE
(De/Dcc=1.00, Gsh/Gcc=1.06)

WORKING EXAMPLE
(De/Dcc=0.92, Gsh/Gcc=1.20)

| | Conventional Example | Comparative Example 1 | Comparative Example 2 | Working Example 1 | Working Example 2 | Working Example 3 | Working Example 4 |
|---|---|---|---|---|---|---|---|
| Presence of circumferential reinforcing layer | None | Yes | Yes | Yes | Yes | Yes | Yes |
| Gsh/Gcc | 1.06 | 1.06 | 1.24 | 1.06 | 1.10 | 1.20 | 1.25 |
| De/Dcc | - | 1.00 | 1.00 | 1.00 | 0.94 | 0.94 | 0.94 |
| Relationship between D1, D2, D3 | D3<D2<D1 | D3<D2<D1 | D3<D2<D1 | D2<D1 D2<D3 | D2<D1 D2<D3 | D2<D1 D2<D3 | D2<D1 D2<D3 |
| Shape of Profile PL1 | Protruding toward outside | Protruding toward outside | Protruding toward outside | Protruding toward outside | Protruding toward outside | Protruding toward outside | Protruding toward outside |
| Shape of profile PL2 | Protruding toward outside | Protruding toward outside | Protruding toward outside | Protruding toward inside | Protruding toward inside | Protruding toward inside | Protruding toward inside |
| AR2/(AR1+AR2) | - | - | - | 0.05 | 0.05 | 0.05 | 0.05 |
| (D1-D2)/CD3-D2) | - | - | - | 0.90 | 0.90 | 0.90 | 0.90 |
| Ws'/WL | - | - | - | 0.55 | 0.55 | 0.55 | 0.55 |
| Wb2'/WL | 0.25 | 0.25 | 0.25 | 0.85 | 0.85 | 0.85 | 0.85 |
| Wsh/TW | 0.92 | 0.92 | 0.92 | 0.25 | 0.25 | 0.25 | 0.25 |
| TW/SW | 0.96 | 0.96 | 0.96 | 0.92 | 0.92 | 0.92 | 0.92 |
| TW/Wca | 1.35 | 1.35 | 1.35 | 0.93 | 0.93 | 0.93 | 0.93 |
| Wsh/Wcc | 0.78 | 0.78 | 0.78 | 1.35 | 1.35 | 1.35 | 1.35 |
| Yc/Ya | - | 0.93 | 0.93 | 0.78 | 0.78 | 0.78 | 0.78 |
| Yd/Ya | - | - | - | 0.93 | 0.93 | 0.93 | 0.93 |
| Angle of large-angle belt ° | 40 | 40 | 40 | 40 | 40 | 40 | 40 |
| Quantity of ends in large-angle belt ends/50 mm | 13 | 13 | 13 | 13 | 13 | 13 | 13 |
| Quantity of ends in cross belts ends/50 mm | 15 | 15 | 15 | 15 | 15 | 15 | 15 |
| Tread rubber hardness | 58 | 58 | 58 | 58 | 58 | 58 | 58 |
| Uneven wear resistance performance | 100 | 102 | 103 | 101 | 102 | 103 | 104 |

FIG. 9A

| | Working Example 5 | Working Example 6 | Working Example 7 | Working Example 8 | Working Example 9 | Working Example 10 | Working Example 11 | Working Example 12 |
|---|---|---|---|---|---|---|---|---|
| Presence of circumferential reinforcing layer | Yes | Yes | Yes | Yes | Yes | Yes | Yes | Yes |
| Gsh/Gcc | 1.20 | 1.25 | 1.25 | 1.25 | 1.20 | 1.25 | 1.25 | 1.25 |
| De/Dcc | 0.92 | 0.65 | 0.80 | 0.95 | 0.92 | 0.80 | 0.80 | 0.80 |
| Relationship between D1, D2, D3 | D2<D1 D2<D3 | D2<D1 D2<D3 | D2<D1 D2<D3 | D2<D1 D2<D3 | D2<D1 D2<D3 | D2<D1 D2<D3 | D2<D1 D2<D3 | D2<D1 D2<D3 |
| Shape of Profile PL1 | Protruding toward outside | Protruding toward outside | Protruding toward outside | Protruding toward outside | Protruding toward outside | Protruding toward outside | Protruding toward outside | Protruding toward outside |
| Shape of profile PL2 | Protruding toward inside | Protruding toward inside | Protruding toward inside | Protruding toward inside | Protruding toward inside | Protruding toward inside | Protruding toward inside | Protruding toward inside |
| AR2/(AR1+AR2) | 0.05 | 0.05 | 0.05 | 0.05 | 0.10 | 0.10 | 0.30 | 0.50 |
| (D1−D2)/(CD3−D2) | 0.90 | 0.90 | 0.90 | 0.90 | 0.90 | 0.90 | 0.90 | 0.90 |
| Ws/WL | 0.55 | 0.55 | 0.55 | 0.55 | 0.55 | 0.55 | 0.55 | 0.55 |
| Wb2/WL | 0.85 | 0.85 | 0.85 | 0.85 | 0.85 | 0.85 | 0.85 | 0.85 |
| Wsh/TW | 0.25 | 0.25 | 0.25 | 0.25 | 0.25 | 0.25 | 0.25 | 0.25 |
| TW/SW | 0.92 | 0.92 | 0.92 | 0.92 | 0.92 | 0.92 | 0.92 | 0.92 |
| TW/Wca | 0.93 | 0.93 | 0.93 | 0.93 | 0.93 | 0.93 | 0.93 | 0.93 |
| Wsh/Wcc | 1.35 | 1.35 | 1.35 | 1.35 | 1.35 | 1.35 | 1.35 | 1.35 |
| Yc/Ya | 0.78 | 0.78 | 0.78 | 0.78 | 0.78 | 0.78 | 0.78 | 0.78 |
| Yd/Ya | 0.93 | 0.93 | 0.93 | 0.93 | 0.93 | 0.93 | 0.93 | 0.93 |
| Angle of large-angle belt ° | 40 | 40 | 40 | 40 | 40 | 40 | 40 | 40 |
| Quantity of ends in large-angle belt ends/50 mm | 13 | 13 | 13 | 13 | 13 | 13 | 13 | 13 |
| Quantity of ends in cross belts ends/50 mm | 15 | 15 | 15 | 15 | 15 | 15 | 15 | 15 |
| Tread rubber hardness | 58 | 58 | 58 | 58 | 58 | 58 | 58 | 58 |
| Uneven wear resistance performance | 105 | 106 | 107 | 106 | 110 | 111 | 113 | 111 |

FIG. 9B

| | Working Example 13 | Working Example 14 | Working Example 15 | Working Example 16 | Working Example 17 | Working Example 18 |
|---|---|---|---|---|---|---|
| Presence of circumferential reinforcing layer | Yes | Yes | Yes | Yes | Yes | Yes |
| Gsh/Gcc | 1.25 | 1.25 | 1.25 | 1.25 | 1.25 | 1.25 |
| De/Dcc | 0.80 | 0.80 | 0.80 | 0.80 | 0.80 | 0.80 |
| Relationship between D1, D2, D3 | D2<D1 D2<D3 | D2<D1 D2<D3 | D2<D1 D2<D3 | D2<D1 D2<D3 | D2<D1 D2<D3 | D2<D1 D2<D3 |
| Shape of profile PL1 | Protruding toward outside | Protruding toward outside | Protruding toward outside | Protruding toward outside | Protruding toward outside | Protruding toward outside |
| Shape of profile PL2 | Protruding toward inside | Protruding toward inside | Protruding toward inside | Protruding toward inside | Protruding toward inside | Protruding toward inside |
| AR2/(AR1+AR2) | 0.30 | 0.30 | 0.30 | 0.30 | 0.30 | 0.30 |
| (D1-D2)/CD3-D2) | 0.30 | 0.50 | 0.70 | 0.50 | 0.50 | 0.50 |
| Ws'/WL | 0.55 | 0.55 | 0.55 | 0.60 | 0.80 | 1.00 |
| Wb2'/WL | 0.85 | 0.85 | 0.85 | 0.85 | 0.85 | 0.85 |
| Wsh/TW | 0.25 | 0.25 | 0.25 | 0.25 | 0.25 | 0.25 |
| TW/SW | 0.92 | 0.92 | 0.92 | 0.92 | 0.92 | 0.92 |
| TW/Wca | 0.93 | 0.93 | 0.93 | 0.93 | 0.93 | 0.93 |
| Wsh/Wcc | 1.35 | 1.35 | 1.35 | 1.35 | 1.35 | 1.35 |
| Yc/Ya | 0.78 | 0.78 | 0.78 | 0.78 | 0.78 | 0.78 |
| Yd/Ya | 0.93 | 0.93 | 0.93 | 0.93 | 0.93 | 0.93 |
| Angle of large-angle belt ° | 40 | 40 | 40 | 40 | 40 | 40 |
| Quantity of ends in large-angle belt ends/50 mm | 13 | 13 | 13 | 13 | 13 | 13 |
| Quantity of ends in cross belts ends/50 mm | 15 | 15 | 15 | 15 | 15 | 15 |
| Tread rubber hardness | 58 | 58 | 58 | 58 | 58 | 58 |
| Uneven wear resistance performance | 115 | 116 | 114 | 118 | 120 | 119 |

FIG. 10A

| | Working Example 19 | Working Example 20 | Working Example 21 | Working Example 22 | Working Example 23 | Working Example 24 |
|---|---|---|---|---|---|---|
| Presence of circumferential reinforcing layer | Yes | Yes | Yes | Yes | Yes | Yes |
| Gsh/Gcc | 1.25 | 1.25 | 1.25 | 1.25 | 1.25 | 1.25 |
| De/Dcc | 0.80 | 0.80 | 0.80 | 0.80 | 0.80 | 0.80 |
| Relationship between D1, D2, D3 | D2<D1 D2<D3 | D2<D1 D2<D3 | D2<D1 D2<D3 | D2<D1 D2<D3 | D2<D1 D2<D3 | D2<D1 D2<D3 |
| Shape of profile PL1 | Protruding toward outside | Protruding toward outside | Protruding toward outside | Protruding toward outside | Protruding toward outside | Protruding toward outside |
| Shape of profile PL2 | Protruding toward inside | Protruding toward inside | Protruding toward inside | Protruding toward inside | Protruding toward inside | Protruding toward inside |
| AR2/(AR1+AR2) | 0.30 | 0.30 | 0.30 | 0.30 | 0.30 | 0.30 |
| (D1-D2)/(CD3-D2) | 0.50 | 0.50 | 0.50 | 0.50 | 0.50 | 0.50 |
| Ws/WL | 0.80 | 0.80 | 0.80 | 0.80 | 0.80 | 0.80 |
| Wb2/WL | 0.90 | 1.10 | 1.30 | 1.10 | 1.10 | 1.10 |
| Wsh/TW | 0.25 | 0.25 | 0.25 | 0.10 | 0.15 | 0.20 |
| TW/SW | 0.92 | 0.92 | 0.92 | 0.92 | 0.92 | 0.92 |
| TW/Wca | 0.93 | 0.93 | 0.93 | 0.93 | 0.93 | 0.93 |
| Wsh/Wcc | 1.35 | 1.35 | 1.35 | 1.35 | 1.35 | 1.35 |
| Yc/Ya | 0.78 | 0.78 | 0.78 | 0.78 | 0.78 | 0.78 |
| Yd/Ya | 0.93 | 0.93 | 0.93 | 0.93 | 0.93 | 0.93 |
| Angle of large-angle belt ° | 40 | 40 | 40 | 40 | 40 | 40 |
| Quantity of ends in large-angle belt ends/50 mm | 13 | 13 | 13 | 13 | 13 | 13 |
| Quantity of ends in cross belts ends/50 mm | 15 | 15 | 15 | 15 | 15 | 15 |
| Tread rubber hardness | 58 | 58 | 58 | 58 | 58 | 58 |
| Uneven wear resistance performance | 121 | 123 | 122 | 124 | 126 | 125 |

FIG. 10B

| | Working Example 25 | Working Example 26 | Working Example 27 | Working Example 28 | Working Example 29 | Working Example 30 | Working Example 31 |
|---|---|---|---|---|---|---|---|
| Presence of circumferential reinforcing layer | Yes | Yes | Yes | Yes | Yes | Yes | Yes |
| Gsh/Gcc | 1.25 | 1.25 | 1.25 | 1.25 | 1.25 | 1.25 | 1.25 |
| De/Dcc | 0.80 | 0.80 | 0.80 | 0.80 | 0.80 | 0.80 | 0.80 |
| Relationship between D1, D2, D3 | D2<D1 D2<D3 | D2<D1 D2<D3 | D2<D1 D2<D3 | D2<D1 D2<D3 | D2<D1 D2<D3 | D2<D1 D2<D3 | D2<D1 D2<D3 |
| Shape of profile PL1 | Protruding toward outside | Protruding toward outside | Protruding toward outside | Protruding toward outside | Protruding toward outside | Protruding toward outside | Protruding toward outside |
| Shape of profile PL2 | Protruding toward inside | Protruding toward inside | Protruding toward inside | Protruding toward inside | Protruding toward inside | Protruding toward inside | Protruding toward inside |
| AR2/(AR1+AR2) | 0.30 | 0.30 | 0.30 | 0.30 | 0.30 | 0.30 | 0.30 |
| (D1-D2)/(CD3-D2) | 0.50 | 0.50 | 0.50 | 0.50 | 0.50 | 0.50 | 0.50 |
| Ws/WL | 0.80 | 0.80 | 0.80 | 0.80 | 0.80 | 0.80 | 0.80 |
| Wb2/WL | 1.10 | 1.10 | 1.10 | 1.10 | 1.10 | 1.10 | 1.10 |
| Wsh/TW | 0.15 | 0.15 | 0.15 | 0.15 | 0.15 | 0.15 | 0.15 |
| TW/SW | 0.79 | 0.85 | 0.89 | 0.85 | 0.85 | 0.79 | 0.79 |
| TW/Wca | 0.93 | 0.93 | 0.93 | 0.91 | 0.82 | 0.93 | 0.93 |
| Wsh/Wcc | 1.35 | 1.35 | 1.35 | 1.35 | 1.35 | 0.90 | 1.10 |
| Yc/Ya | 0.78 | 0.78 | 0.78 | 0.78 | 0.78 | 0.78 | 0.78 |
| Yd/Ya | 0.93 | 0.93 | 0.93 | 0.93 | 0.93 | 0.93 | 0.93 |
| Angle of large-angle belt ° | 40 | 40 | 40 | 40 | 40 | 40 | 40 |
| Quantity of ends in large-angle belt ends/50 mm | 13 | 13 | 13 | 13 | 13 | 13 | 13 |
| Quantity of ends in cross belts ends/50 mm | 15 | 15 | 15 | 15 | 15 | 15 | 15 |
| Tread rubber hardness | 58 | 58 | 58 | 58 | 58 | 58 | 58 |
| Uneven wear resistance performance | 127 | 129 | 128 | 130 | 131 | 130 | 132 |

FIG. 11A

| | Working Example 32 | Working Example 33 | Working Example 34 | Working Example 35 | Working Example 36 | Working Example 37 | Working Example 38 |
|---|---|---|---|---|---|---|---|
| Presence of circumferential reinforcing layer | Yes | Yes | Yes | Yes | Yes | Yes | Yes |
| Gsh/Gcc | 1.25 | 1.25 | 1.25 | 1.25 | 1.25 | 1.25 | 1.25 |
| De/Dcc | 0.80 | 0.80 | 0.80 | 0.80 | 0.80 | 0.80 | 0.80 |
| Relationship between D1, D2, D3 | D2<D1 D2<D3 | D2<D1 D2<D3 | D2<D1 D2<D3 | D2<D1 D2<D3 | D2<D1 D2<D3 | D2<D1 D2<D3 | D2<D1 D2<D3 |
| Shape of profile PL1 | Protruding toward outside | Protruding toward outside | Protruding toward outside | Protruding toward outside | Protruding toward outside | Protruding toward outside | Protruding toward outside |
| Shape of profile PL2 | Protruding toward inside | Protruding toward inside | Protruding toward inside | Protruding toward inside | Protruding toward inside | Protruding toward inside | Protruding toward inside |
| AR2/(AR1+AR2) | 0.30 | 0.30 | 0.30 | 0.30 | 0.30 | 0.30 | 0.30 |
| (D1-D2)/(CD3-D2) | 0.50 | 0.50 | 0.50 | 0.50 | 0.50 | 0.50 | 0.50 |
| Ws/WL | 0.80 | 0.80 | 0.80 | 0.80 | 0.80 | 0.80 | 0.80 |
| Wb2/WL | 1.10 | 1.10 | 1.10 | 1.10 | 1.10 | 1.10 | 1.10 |
| Wsh/TW | 0.15 | 0.15 | 0.15 | 0.15 | 0.15 | 0.15 | 0.15 |
| TW/SW | 0.79 | 0.79 | 0.79 | 0.79 | 0.79 | 0.79 | 0.79 |
| TW/Wca | 0.93 | 0.93 | 0.93 | 0.93 | 0.93 | 0.93 | 0.93 |
| Wsh/Wcc | 1.30 | 1.10 | 1.10 | 1.10 | 1.10 | 1.10 | 1.10 |
| Yc/Ya | 0.78 | 0.80 | 0.85 | 0.90 | 0.85 | 0.85 | 0.85 |
| Yd/Ya | 0.93 | 0.93 | 0.93 | 0.93 | 0.95 | 0.98 | 1.02 |
| Angle of large-angle belt ° | 40 | 40 | 40 | 40 | 40 | 40 | 40 |
| Quantity of ends in large-angle belt ends/50 mm | 13 | 13 | 13 | 13 | 13 | 13 | 13 |
| Quantity of ends in cross belts ends/50 mm | 15 | 15 | 15 | 15 | 15 | 15 | 15 |
| Tread rubber hardness | 58 | 58 | 58 | 58 | 58 | 58 | 58 |
| Uneven wear resistance performance | 131 | 133 | 135 | 134 | 136 | 138 | 137 |

FIG. 11B

| | Working Example 39 | Working Example 40 | Working Example 41 | Working Example 42 | Working Example 43 | Working Example 44 |
|---|---|---|---|---|---|---|
| Presence of circumferential reinforcing layer | Yes | Yes | Yes | Yes | Yes | Yes |
| Gsh/Gcc | 1.25 | 1.25 | 1.25 | 1.25 | 1.25 | 1.25 |
| De/Dcc | 0.80 | 0.80 | 0.80 | 0.80 | 0.80 | 0.80 |
| Relationship between D1, D2, D3 | D2<D1 D2<D3 | D2<D1 D2<D3 | D2<D1 D2<D3 | D2<D1 D2<D3 | D2<D1 D2<D3 | D2<D1 D2<D3 |
| Shape of profile PL1 | Protruding toward outside | Protruding toward outside | Protruding toward outside | Protruding toward outside | Protruding toward outside | Protruding toward outside |
| Shape of profile PL2 | Protruding toward inside | Protruding toward inside | Protruding toward inside | Protruding toward inside | Protruding toward inside | Protruding toward inside |
| AR2/(AR1+AR2) | 0.30 | 0.30 | 0.30 | 0.30 | 0.30 | 0.30 |
| (D1-D2)/CD3-D2) | 0.50 | 0.50 | 0.50 | 0.50 | 0.50 | 0.50 |
| Ws/WL | 0.80 | 0.80 | 0.80 | 0.80 | 0.80 | 0.80 |
| Wb2'/WL | 1.10 | 1.10 | 1.10 | 1.10 | 1.10 | 1.10 |
| Wsh/TW | 0.15 | 0.15 | 0.15 | 0.15 | 0.15 | 0.15 |
| TW/SW | 0.79 | 0.79 | 0.79 | 0.79 | 0.79 | 0.79 |
| TW/Wca | 0.93 | 0.93 | 0.93 | 0.93 | 0.93 | 0.93 |
| Wsh/Wcc | 1.10 | 1.10 | 1.10 | 1.10 | 1.10 | 1.10 |
| Yc/Ya | 0.80 | 0.85 | 0.90 | 0.85 | 0.85 | 0.85 |
| Yd/Ya | 0.93 | 0.93 | 0.93 | 0.93 | 0.93 | 0.93 |
| Angle of large-angle belt ° | 45 | 60 | 70 | 60 | 60 | 60 |
| Quantity of ends in large-angle belt ends/50 mm | 13 | 13 | 13 | 15 | 20 | 25 |
| Quantity of ends in cross belts ends/50 mm | 15 | 15 | 15 | 15 | 15 | 15 |
| Tread rubber hardness | 58 | 58 | 58 | 58 | 58 | 58 |
| Uneven wear resistance performance | 139 | 141 | 140 | 142 | 144 | 143 |

FIG. 12A

| | Working Example 45 | Working Example 46 | Working Example 47 | Working Example 48 | Working Example 49 | Working Example 50 |
|---|---|---|---|---|---|---|
| Presence of circumferential reinforcing layer | Yes | Yes | Yes | Yes | Yes | Yes |
| Gsh/Gcc | 1.25 | 1.25 | 1.25 | 1.25 | 1.25 | 1.25 |
| De/Dcc | 0.80 | 0.80 | 0.80 | 0.80 | 0.80 | 0.80 |
| Relationship between D1, D2, D3 | D2<D1 D2<D3 | D2<D1 D2<D3 | D2<D1 D2<D3 | D2<D1 D2<D3 | D2<D1 D2<D3 | D2<D1 D2<D3 |
| Shape of profile PL1 | Protruding toward outside | Protruding toward outside | Protruding toward outside | Protruding toward outside | Protruding toward outside | Protruding toward outside |
| Shape of profile PL2 | Protruding toward inside | Protruding toward inside | Protruding toward inside | Protruding toward inside | Protruding toward inside | Protruding toward inside |
| AR2/(AR1+AR2) | 0.30 | 0.30 | 0.30 | 0.30 | 0.30 | 0.30 |
| (D1-D2)/CD3-D2) | 0.50 | 0.50 | 0.50 | 0.50 | 0.50 | 0.50 |
| Ws/WL | 0.80 | 0.80 | 0.80 | 0.80 | 0.80 | 0.80 |
| Wb2'/WL | 1.10 | 1.10 | 1.10 | 1.10 | 1.10 | 1.10 |
| Wsh/TW | 0.15 | 0.15 | 0.15 | 0.15 | 0.15 | 0.15 |
| TW/SW | 0.79 | 0.79 | 0.79 | 0.79 | 0.79 | 0.79 |
| TW/Wca | 0.93 | 0.93 | 0.93 | 0.93 | 0.93 | 0.93 |
| Wsh/Wcc | 1.10 | 1.10 | 1.10 | 1.10 | 1.10 | 1.10 |
| Yc/Ya | 0.85 | 0.85 | 0.85 | 0.85 | 0.85 | 0.85 |
| Yd/Ya | 0.93 | 0.93 | 0.93 | 0.93 | 0.93 | 0.93 |
| Angle of large-angle belt ° | 60 | 60 | 60 | 60 | 60 | 60 |
| Quantity of ends in large-angle belt ends/50 mm | 20 | 20 | 20 | 20 | 20 | 20 |
| Quantity of ends in cross belts ends/50 mm | 18 | 23 | 28 | 23 | 23 | 23 |
| Tread rubber hardness | 58 | 58 | 58 | 60 | 63 | 66 |
| Uneven wear resistance performance | 145 | 147 | 146 | 148 | 149 | 150 |

FIG. 12B

PNEUMATIC TIRE

TECHNICAL FIELD

The present technology relates to a pneumatic tire, and particularly relates to a pneumatic tire with improved uneven wear resistance performance.

BACKGROUND ART

In recent years, heavy duty tires mounted on trucks, buses, and the like maintain the shape of the tread portion due to the tires having a low aspect ratio while having a circumferential reinforcing layer disposed in a belt layer. The circumferential reinforcing layer is a belt ply having a belt angle that is substantially 0° with respect to the tire circumferential direction, and is disposed so as to be stacked upon a pair of cross belts. The technologies disclosed in Japanese Patent Nos. 4642760B, 4663638B and 4663639B, as well as in Japanese Unexamined Patent Application Publication No. 2012-522686 are conventional pneumatic tires that are configured in this manner.

A pneumatic tire has a problem in that uneven wear of a shoulder land portion needs to be suppressed.

SUMMARY

The present technology provides a pneumatic tire with improved uneven wear resistance performance.

A pneumatic tire of the present technology includes a carcass layer, a belt layer disposed on an outer side of the carcass layer in the tire radial direction, and a tread rubber disposed on an outer side of the belt layer in the tire radial direction. The pneumatic tire also includes at least three circumferential main grooves extending in a tire circumferential direction, and a plurality of land portions partitioned and formed by the circumferential main grooves. The belt layer is formed by laminating a pair of cross belts each having a belt angle of not less than 10° and not more than 45° as an absolute value and having mutually opposite signs, and a circumferential reinforcing layer having a belt angle within a range of ±5° with respect to the tire circumferential direction. Among the circumferential main grooves, left and right circumferential main grooves on an outermost side in a tire width direction are referred to as an outermost circumferential main groove, and a land portion closer to an outer side in the tire width direction than the left and right outermost circumferential main grooves is referred to as a shoulder land portion. In a cross-sectional view taken along the tire meridian direction, a diameter D1 at a point P1 on an edge portion on an inner side of the shoulder land portion in the tire width direction, a diameter D2 at a predetermined point P2 within a ground-contact surface of the shoulder land portion, and a diameter D3 of a tire ground contact edge T have a relationship such that D2<D1 and D2<D3.

In the pneumatic tire according to the present technology, a profile of the shoulder land portion in a ground contact region includes a small-diameter portion (a point having a diameter D2 such that D2<D1 and D2<D3) between an edge portion on the inner side in the tire width direction and the tire ground contact edge T. According to this configuration, the ground contact pressure on the side of the ground contact edge T of the shoulder land portion when the tire contacts the ground is increased. Also, the amount of slippage at a center region of the land portion 3 and the amount of slippage of the shoulder land portion when the tire contacts the ground are averaged. As a result, this has the advantage in that the uneven wear of the shoulder land portion 3 is effectively suppressed.

BRIEF DESCRIPTION OF THE DRAWINGS

FIGS. 9A-9B include a table showing results of performance testing of pneumatic tires according to embodiments of the present technology.

FIGS. 10A-10B include a table showing results of performance testing of pneumatic tires according to embodiments of the present technology.

FIGS. 11A-11B include a table showing results of performance testing of pneumatic tires according to embodiments of the present technology.

FIGS. 12A-12B include a table showing results of performance testing of pneumatic tires according to embodiments of the present technology.

DETAILED DESCRIPTION

The present technology is described in detail below, with reference to the accompanying drawings. However, the present technology is not limited to these embodiments. Moreover, components that can possibly or obviously be substituted while maintaining consistency with the present technology are included as components of the embodiments. Furthermore, a plurality of modified examples that are described in the embodiment may be freely combined within the scope of obviousness for a person skilled in the art.

Pneumatic Tire

Figure 1:
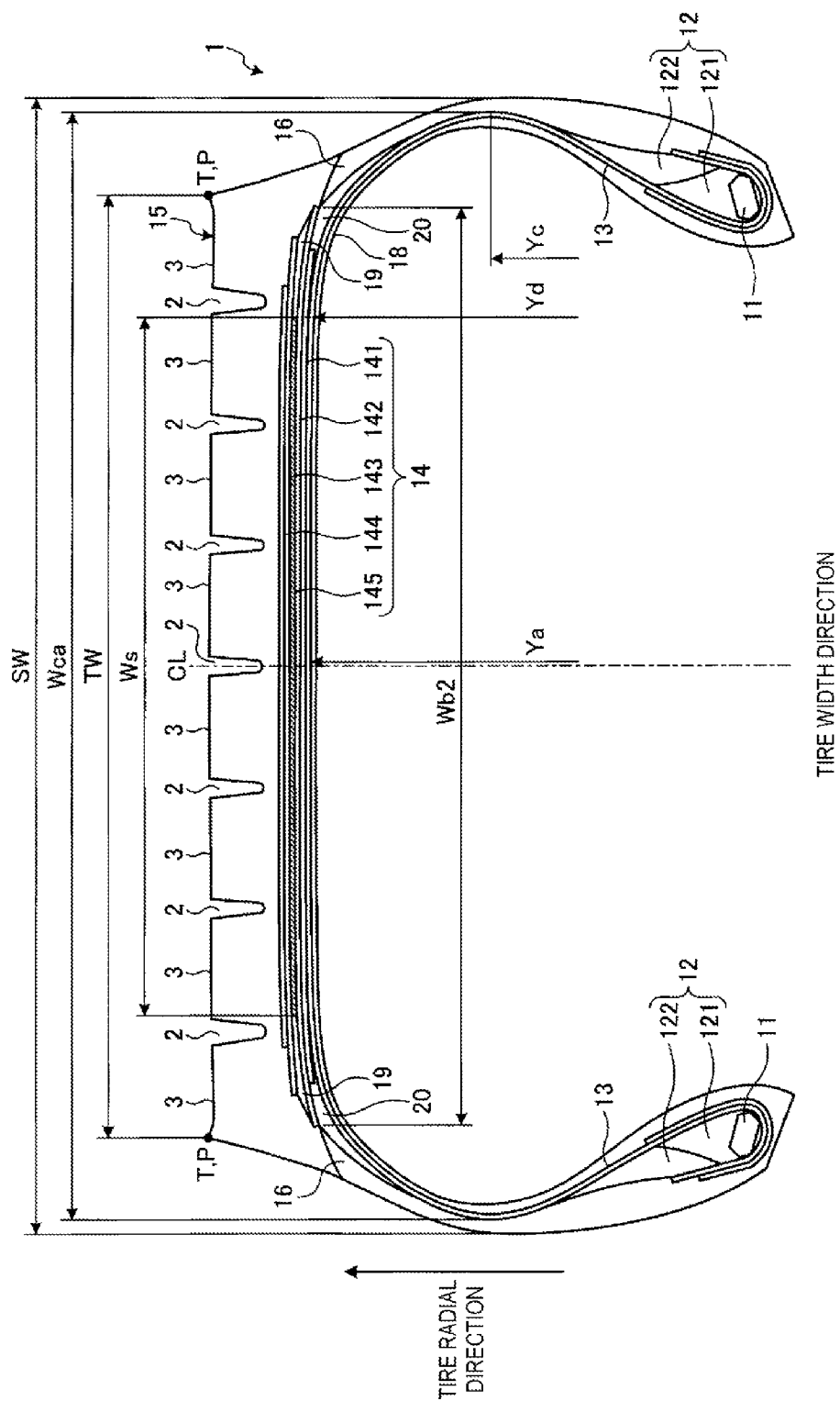
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In this drawing, a radial tire for heavy loads that is mounted on a truck, a bus, or the like for long-distance transport is illustrated as an example of the pneumatic tire 1. Note that the reference sign CL refers to a tire equatorial plane. Moreover, a tread edge P and a tire ground contact edge T are in accord with each other in FIG. 1. A circumferential reinforcing layer 145 is indicated by hatching in FIG. 1.

The pneumatic tire 1 includes a pair of bead cores 11, 11, a pair of bead fillers 12, 12, a carcass layer 13, a belt layer 14, a tread rubber 15, and a pair of side wall rubbers 16, 16 (see FIG. 1).

The pair of bead cores 11, 11 each have an annular structure and constitute cores of left and right bead portions. The pair of bead fillers 12, 12 is formed from a lower filler 121 and an upper filler 122, and is disposed on a periphery of the pair of bead cores 11, 11 in the tire radial direction so as to reinforce the bead portions.

The carcass layer 13 extends in toroidal form between the bead cores 11, 11 on the left and right, forming a framework for the tire. Additionally, both end portions of the carcass layer 13 are turned back from an inner side in a tire width direction toward an outer side in the tire width direction and are fixed so as to wrap around the bead cores 11 and the bead fillers 12. Also, the carcass layer 13 is constituted by a plurality of carcass cords formed from steel or an organic fiber material (for example, nylon, polyester, rayon, or the like) covered by a coating rubber and subjected to a rolling process, and has a carcass angle of not less than 85° and not more than 95° as an absolute value (an angle of inclination of the carcass cord in a fiber direction with respect to the tire circumferential direction).

The belt layer 14 is formed by laminating a plurality of belt plies 141 to 145, and is disposed to extend over a periphery of the carcass layer 13. The specific configuration of the belt layer 14 is described below.

The tread rubber 15 is disposed on an outer circumference of the carcass layer 13 and the belt layer 14 in the tire radial direction, and forms a tread portion of the tire. The pair of side wall rubbers 16, 16 is disposed on both outer sides of the carcass layer 13 in the tire width direction, so as to form left and right side wall portions of the tire.

In the configuration illustrated in FIG. 1, the pneumatic tire 1 includes seven circumferential main grooves 2 that extend in the tire circumferential direction, and eight land portions 3 partitioned and formed by the circumferential main grooves 2. The land portions 3 are each formed of ribs that are continuous in the tire circumferential direction or blocks that are segmented in the tire circumferential direction by lug grooves (not illustrated in the drawings).

Here, the term circumferential main groove refers to a circumferential groove having a groove width of not less than 5.0 mm. The groove width of the circumferential main groove is measured excluding any notched portions and/or chamfered portions formed at a groove opening portion.

Additionally, in the pneumatic tire 1, the left and right circumferential main grooves 2, 2 on the outermost side in the tire width direction are referred to as outermost circumferential main grooves. Moreover, left and right land portions 3, 3 on the outer side in the tire width direction that are defined by the left and right outermost circumferential main grooves 2, 2 are referred to as shoulder land portions.

Belt Layer

Figure 2:
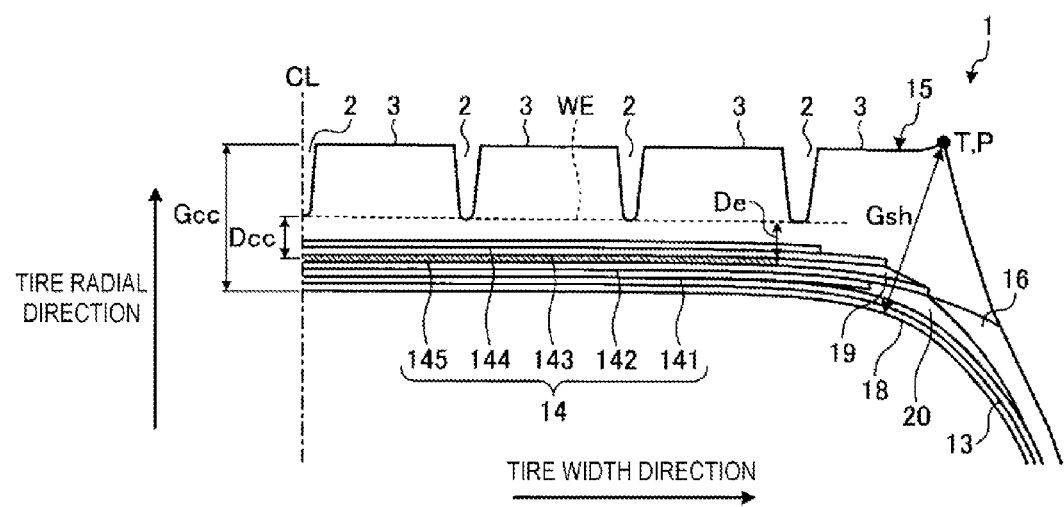
FIG. 2 is an explanatory view illustrating a belt layer of the pneumatic tire depicted in FIG. 1.
Figure 3:
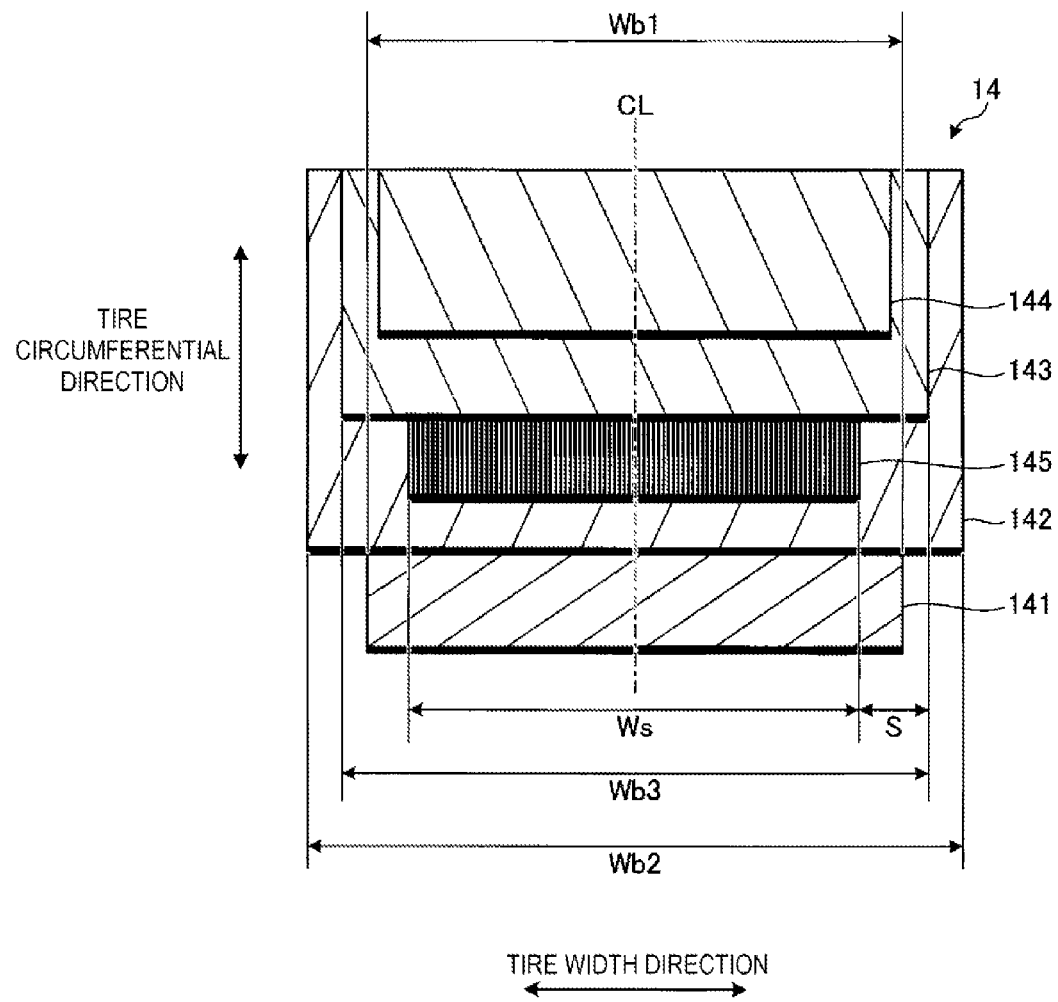
FIG. 3 is an explanatory view illustrating the belt layer of the pneumatic tire depicted in FIG. 1.

FIG. 2 and FIG. 3 are explanatory views illustrating a belt layer of the pneumatic tire depicted in FIG. 1. In these drawings, FIG. 2 illustrates a region on one side of a tread portion demarcated by the tire equatorial plane CL, and FIG. 3 illustrates a laminated structure of the belt layer 14. Furthermore, the thin lines in the belt plies 141 to 145 in FIG. 3 schematically represent the respective belt cords of the belt plies 141 to 145.

The belt layer 14 is formed by laminating a large-angle belt 141, a pair of cross belts 142, 143, a belt cover 144, and a circumferential reinforcing layer 145, and is disposed by being wound and mounted onto the periphery of the carcass layer 13 (see FIG. 2).

The large-angle belt 141 is configured by a plurality of belt cords formed from steel or an organic fiber material covered with coating rubber and subjecting to a rolling process, the large-angle belt 141 having a belt angle of not less than 45° and not more than 70° as an absolute value (an angle of inclination of the fiber direction of the belt cords with respect to the tire circumferential direction). Moreover, the large-angle belt 141 is disposed so as to be laminated on the outer side in the tire radial direction of the carcass layer 13.

The pair of cross belts 142, 143 is configured by a plurality of belt cords formed from steel or an organic fiber material covered with coating rubber and subjected to a rolling process, the pair of cross belts 142, 143 having a belt angle of not less than 10° and not more than 45° as an absolute value. Additionally, the pair of cross belts 142, 143 has belt angles that are of mutually opposite signs to each other, and are laminated so that the fiber directions of the belt cords intersect each other (a crossply structure). In the following description, the cross belt 142 positioned on the inner side in the tire radial direction is referred to as an inner-side cross belt, and the cross belt 143 positioned on the outer side in the tire radial direction is referred to as an outer-side cross belt. Three or more cross belts may be disposed so as to be laminated (not illustrated in the drawings). In addition, in the present embodiment, the pair of cross belts 142, 143 is disposed so as to be laminated on the outer side of the large-angle belt 141 in the tire radial direction.

Also, the belt cover 144 is configured by a plurality of belt cords formed from steel or an organic fibers material covered with coating rubber, and subjecting a rolling process, the belt cover 144 having a belt angle of not less than 10° and not more than 45° as an absolute value. In addition, the belt cover 144 is disposed so as to be laminated on the outer side of the pair of cross belts 142, 143 in the tire radial direction. Moreover, in this embodiment, the belt cover 144 has the same belt angle as the outer-side cross belt 143, and is disposed in the outermost layer of the belt layer 14.

The circumferential reinforcing layer 145 is configured by belt cords formed from steel, and covered with coating rubber that are wound in a spiral manner with an inclination within a range of ±5° with respect to the tire circumferential direction. In addition, the circumferential reinforcing layer 145 is disposed so as to be sandwiched between the pair of cross belts 142, 143 in the present embodiment. Additionally, the circumferential reinforcing layer 145 is disposed closer to the inner side in the tire width direction than the left and right edge portions of the pair of cross belts 142, 143. Specifically, the circumferential reinforcing layer 145 is formed by winding one or a plurality of wires in a spiral manner around the periphery of the inner-side cross belt 142. This circumferential reinforcing layer 145 reinforces the stiffness in the tire circumferential direction. As a result, the tire durability of the tire is improved.

Here, in the pneumatic tire 1, the belt layer 14 may have an edge cover (not illustrated in the drawings). Generally, the edge cover is configured by a plurality of belt cords formed from steel or an organic fiber material covered with coating rubber and subjected to a rolling process, the edge cover having a belt angle of not less than 0° and not more than 5° as an absolute value. Additionally, the edge cover is disposed on the outer side of the left and right edges of the outer-side cross belt 143 (or of the inner-side cross belt 142) in the tire radial direction. The difference in radial growth between a center region and a shoulder region of the tread portion is reduced and uneven wear resistance performance of the tire is improved due to a hoop effect demonstrated by the edge cover.

Additionally, in the configuration illustrated in FIG. 2, the circumferential reinforcing layer 145 is disposed so as to be interposed between the pair of cross belts 142, 143 (see FIG. 2). However, the circumferential reinforcing layer 145 is not limited as such, and may also be disposed on the outer side of the pair of cross belts 142, 143 in the tire radial direction (not illustrated in the drawings). Additionally, the circumferential reinforcing layer 145 may also be disposed on the inner side of the pair of cross belts 142, 143. For example, the circumferential reinforcing layer 145 may be (1) disposed between the large-angle belt 141 and the inner-side cross belt 142, or (2) disposed between the carcass layer 13 and the large-angle belt 141 (not illustrated in the drawings).

Improved Uneven Wear Resistance Performance

Recent heavy duty tires mounted on trucks, buses, and the like maintain the shape of the tread portion due to the tires having a low aspect ratio while having a circumferential reinforcing layer disposed in the belt layer. Specifically, by disposing the circumferential reinforcing layer at the tread center region, and exploiting a hoop effect thereof, radial growth of the tread portion is suppressed and the shape of the tread portion is maintained.

According to this configuration, the above-described hoop effect may be obtained within a setting range of the circumferential reinforcing layer. However, in contrast, the stiffness in the tire circumferential direction is relatively insufficient outside the setting range of the circumferential reinforcing layer (in a region at the outer side in the tire width direction). As such, during rolling motion of the tire, greater slippage occurs at the shoulder land portion, which poses the problem of uneven wear occurring at the shoulder land portion.

Thus, this pneumatic tire 1 uses the following configuration in order to suppress the uneven wear in the shoulder land portion (see FIGS. 1 to 3).

First, as illustrated in FIG. 2, a wear end surface WE of the circumferential main groove 2 is drawn in a cross-sectional view taken along the tire meridian direction. The term wear end surface WE refers to a surface estimated from a wear indicator present in the tire. Additionally, the wear end surface WE is measured under the condition of a single tire with the tire in a non-inflated state. In a typical pneumatic tire, the wear end surface WE is on a curved line that is roughly parallel to a tread profile.

Here, a distance Dcc from the circumferential reinforcing layer 145 to the wear end surface WE and a distance De from an end of the circumferential reinforcing layer 145 to the wear end surface WE, each measured in the tire equatorial plane CL, preferably have a relationship such that De/Dcc≤0.94, and more preferably have a relationship such that De/Dcc≤0.92. No particular lower limit is given for the ratio De/Dcc. However, the lower limit is constrained by the relationship to the distance between the outermost belt layer and the wear end surface WE. For example, the lower limit of the ratio De/Dcc is preferably within a range of 0.65≤De/Dcc.

The distance Dcc and the distance De are measured under the condition of a single tire with the tire in a non-inflated state. Additionally, the measurement point on the circumferential reinforcing layer 145 side is defined by a curve connecting the center points of the belt cords that constitute the circumferential reinforcing layer 145, in a cross-sectional view taken along the tire meridian direction. Moreover, the end portion of the circumferential reinforcing layer 145 is defined using the belt cord on the outermost side in the tire width direction among the belt cords that constitute the circumferential reinforcing layer 145.

Herein, the term standard rim refers to an applicable rim as defined by the Japan Automobile Tyre Manufacturers Association (JATMA), a design rim as defined by the Tire and Rim Association (TRA), or a measuring rim defined by the European Tyre and Rim Technical Organization (ETRTO). The term regular inner pressure refers to maximum air pressure as stipulated by JATMA, a maximum value in Tire Load Limits at various Cold Inflation Pressures as defined by TRA, and Inflation Pressures as stipulated by ETRTO. Note also that the term regular load refers to a maximum load capacity stipulated by JATMA, a maximum value in Tire Load Limits at various Cold Inflation Pressures as defined by TRA, and a Load Capacity as stipulated by ETRTO. However, with JATMA, in the case of passenger car tires, the regular internal pressure is an air pressure of 180 kPa, and the regular load is 88% of the maximum load capacity.

Moreover, the distance Gcc from the tread profile to the tire inner circumferential surface and the distance Gsh from a tread edge P to the tire inner circumferential surface, each measured in the tire equatorial plane CL, preferably have a relationship such that 1.10≤Gsh/Gcc, and more preferably have a relationship such that 1.20≤Gsh/Gcc.

Figure 7:
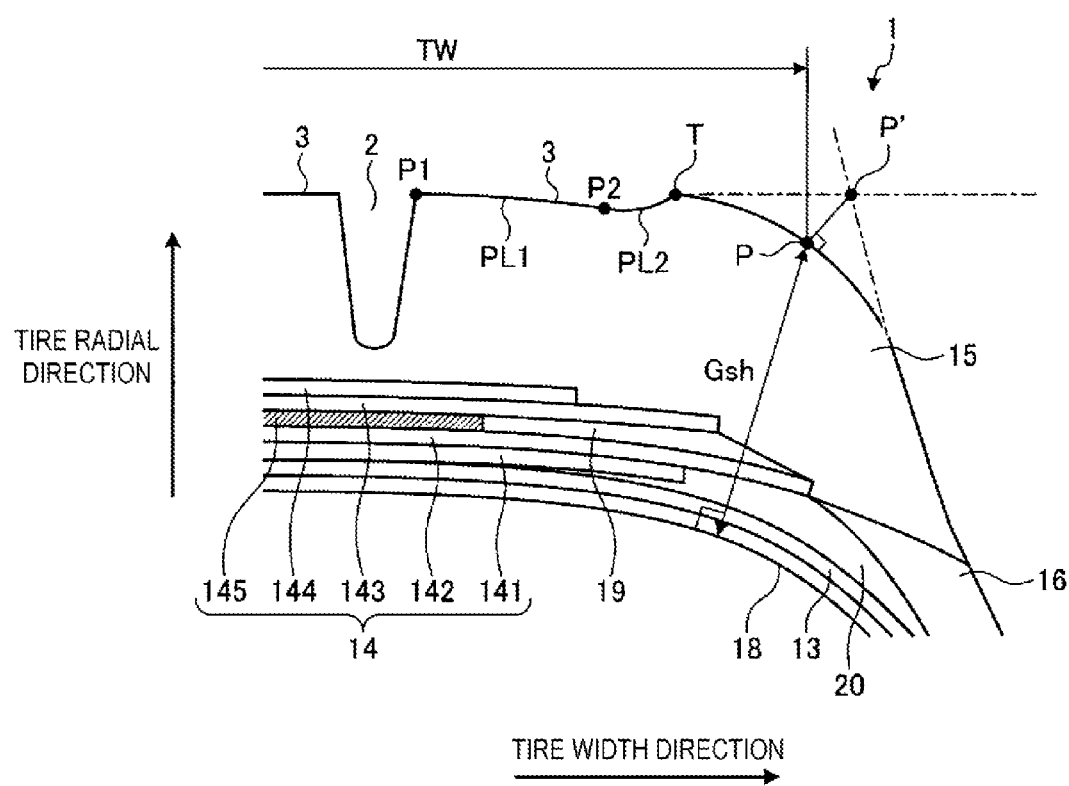
FIG. 7 is an explanatory view illustrating a modified example of the pneumatic tire depicted in FIG. 1.

The upper limit of the ratio Gsh/Gcc is not particularly limited. However, the upper limit of the ratio Gsh/Gcc is preferably defined such that a radius at the tread edge P of the tread profile is equal to or less than the radius at the tire equatorial plane CL when the tire is mounted on a standard rim and inflated to a regular inner pressure and is in an unloaded state. That is, the upper limit of the ratio Gsh/Gcc is preferably defined such that the tread profile has a curved shape centered on the inner side in the tire radial direction or has a straight linear shape, and does not form an inverse R shape (i.e., a curved shape centered on the outer side in the tire radial direction). For example, in a configuration having a square shaped shoulder portion as illustrated in FIG. 2, the upper limit of the ratio Gsh/Gcc is approximately from 1.4 to 1.5. Conversely, in a configuration having a round shaped shoulder portion as illustrated in FIG. 7 as described later, the upper limit of the ratio Gsh/Gcc is approximately from 1.3 to 1.4.

The distance Gcc is measured as the distance from the intersection between the tire equatorial plane CL and the tread profile to the intersection between the tire equatorial plane CL and the tire inner circumferential surface in a cross-sectional view taken along the tire meridian direction. Therefore, in a configuration having a circumferential main groove 2 at the tire equatorial plane CL, such as the configuration illustrated in FIG. 1 and FIG. 2, the distance Gcc is measured excluding the circumferential main groove 2. The distance Gsh is measured as the length of a perpendicular line from the tread edge P to the tire inner circumferential surface in a cross-sectional view taken along the tire meridian direction.

In the configuration illustrated in FIG. 2, the pneumatic tire 1 includes an inner liner 18 on the inner circumferential surface of the carcass layer 13, and the inner liner 18 is disposed across the entire region of the tire inner circumferential surface. According to a configuration, the distance Gcc and the distance Gsh are measured on the basis of the outer surface of the inner liner 18 (tire inner circumferential surface).

The tread edge P refers to (1) a point of the tread edge portion in a configuration having a square shaped shoulder portion. For example, in the configuration illustrated in FIG. 2, the tread edge P and a tire ground contact edge T are in accord with each other due to the shoulder portion having a square shape. Conversely, (2) in a configuration having the round shaped shoulder portion, as illustrated in the modified example of FIG. 7 described later, taking an intersection P' between the tread portion profile and the side wall portion profile in a cross-sectional view taken along the tire meridian direction, the tread edge P is taken as the bottom of a perpendicular line drawn from the intersection P' to the shoulder portion.

Additionally, the tire ground contact edge T refers to a maximum width position in a tire axial direction of a contact surface between the tire and a flat plate in a configuration in which the tire is mounted on a standard rim, inflated to a regular inner pressure, placed perpendicularly to the flat plate in a static state, and loaded with a load corresponding to a regular load.

Figure 4:
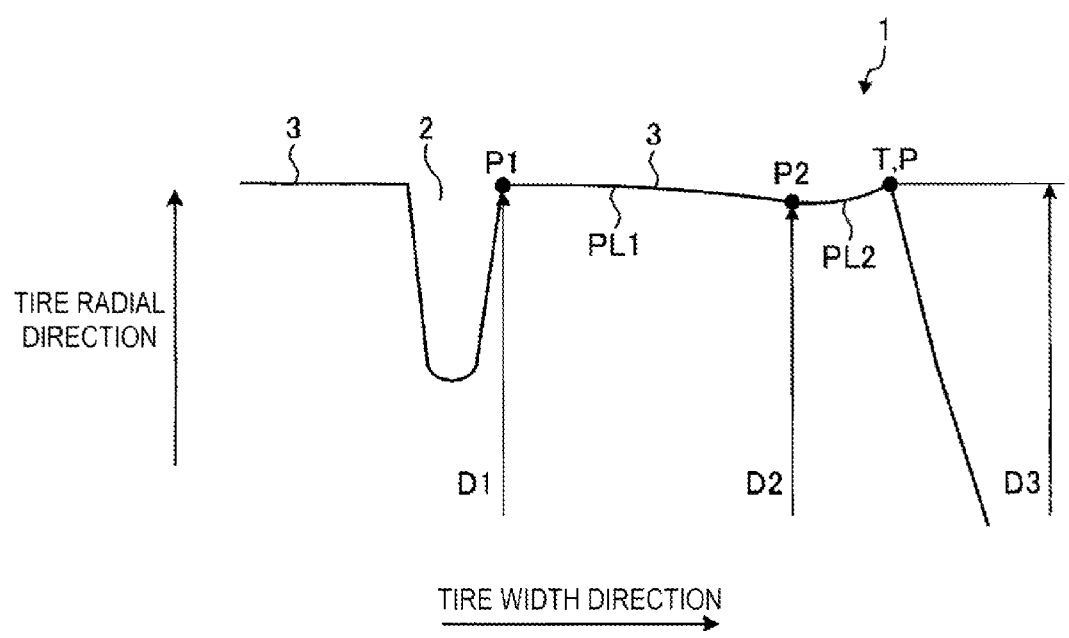
FIG. 4 is an enlarged view illustrating a shoulder land portion of the pneumatic tire depicted in FIG. 1.

FIG. 4 is an enlarged view depicting the shoulder land portion 3 of the pneumatic tire 1 depicted in FIG. 1. In FIG. 4, a profile shape of the shoulder land portion 3 within a ground-contact surface is depicted.

As illustrated in FIG. 4, the pneumatic tire 1, in a cross-sectional view taken along the tire meridian direction, has a diameter D1 at a point P1 on an edge portion at the inner side of the shoulder land portion 3 in the tire width direction, a diameter D2 at a predetermined point P2 on the ground-contact surface of the shoulder land portion 3, and a diameter D3 of the tire ground contact edge T having a relationship such that D2<D1, and D2<D3.

Here, the diameter D1 at the point P1 is not particularly limited as size relative to the diameter D3 of the tire ground contact edge T. Accordingly, the shoulder land portion 3 need only have the point P2 having the diameter D2 that is smaller than the diameters D1, D3 be located on the profile of the ground-contact surface. In addition, given that a region from the point P1 to the tire ground contact edge T is the ground-contact surface of the shoulder land portion 3, the point P2 is between the point P1 and the tire ground contact edge T.

Also, the profile of the shoulder land portion 3 in the ground-contact surface may be thought of as being divided into a first profile PL1 in a segment from the point P1 to the point P2, and a second profile PL2 in a segment from the point P2 to the tire ground contact edge T. Here, each of the first profile PL1 and the second profile PL2 is preferably a smooth curved line formed from a single arc or from a plurality of arcs in combination. However, no such limitation is intended. One or both of the first profile PL1 and the second profile PL2 may be a curved line that includes a straight line or a straight line segment.

Specifically, the second profile PL2 may have any desired profile shape, provided that the above-described positional relationship between the point P2 and the tire ground contact edge T (D2<D3) is satisfied. That is, the second profile PL2 may have any desired profile shape, with the condition that the tire ground contact edge T protrudes toward the outer side in the tire radial direction, relative to the point P2. For example, the second profile PL2 may be made up of a curved line that protrudes toward the inner side in the tire radial direction, and of curved lines, straight lines, and the like that protrude toward the outer side in the tire radial direction.

The profile shape and the diameters of the profile are measured when the tire is mounted on a standard rim, inflated the tire to a regular inner pressure, and is in an unloaded state. In addition, the diameters of the profile are measured as respective diameters of the profile as centered on the tire rotational axis.

For example, in the configuration of FIG. 4, the first profile PL1 is formed from a single arc that protrudes toward the outer side in the tire radial direction. In addition, the second profile PL2 is formed from a single arc that protrudes toward the inner side in the tire radial direction, and is smoothly continuous with the first profile PL1 at the point P2. For this reason, in a cross-sectional view taken along the tire meridian direction, the shoulder land portion 3 has an overall profile that is substantially in the shape of a loose letter S, and the point P2 is located on an inflection point thereof. In addition, land portions from the outermost circumferential main groove 2 to the inner side in the tire width direction (a center land portion 3 and a second land portion 3) have a profile that protrudes toward the outer side in the tire radial direction. Furthermore, these land portions 3 each have a profile that is a single arc or is a plurality of arcs in combination. As such, the first profile PL1 is along a line extending from the profiles of the center land portion 3 and the second land portion 3, and conforms to these profiles. In addition, the first profile PL1 has a diameter that decreases from the point P1 toward the outer side in the tire width direction, being smallest at the point P2. Also, the second profile PL2 has a diameter that grows toward the outer side in the tire width direction. As a result, the shoulder land portion 3 has a ground-contact surface shape that rises upward from the point P2 toward the tire ground contact edge T on the outer side in the tire radial direction.

Here, in the above-described configuration, a length AR1 (not illustrated in the drawings) of the first profile PL1 and a length AR2 (not illustrated in the drawings) of the second profile PL2 preferably have a relationship such that $0.10 \leq AR2/(AR1+AR2) \leq 0.50$, and more preferably have a relationship such that $0.20 \leq AR2/(AR1+AR2) \leq 0.40$ (see FIG. 4). Accordingly, the proportions of the length AR1 of the first profile PL1 and the length AR2 of the second profile PL2 are made appropriate, and the stiffness of the shoulder land portion 3 is reinforced.

The lengths AR1, AR2 are respective lengths of line segments in the profiles PL1, PL2 in a cross-sectional view taken along the tire meridian direction, and are measured with the tire mounted on a standard rim and inflated to a regular inner pressure while being in an unloaded state.

In addition, in the above-described configuration, the diameter D1 at the point P1, the diameter D2 at the point D2, and the diameter D3 on the side of tire ground contact edge T preferably have a relationship such that $0.30 \leq (D1-D2)/(D3-D2) \leq 0.70$, and more preferably have a relationship such that $0.40 \leq (D1-D2)/(D3-D2) \leq 0.60$ (see FIG. 4). As a result, the relationship between the shoulder dropping amount D1−D2 of the shoulder land portion 3 in the first profile PL1 and the shoulder dropping amount of D3−D2 of the shoulder land portion 3 in the second profile PL2 is made appropriate. In addition, given that (D1−D2)<(D3−D2), the stiffness on the side of the tire ground contact edge T of the shoulder land portion 3 is reinforced, and uneven wear of the shoulder land portion 3 is suppressed.

Figure 5:
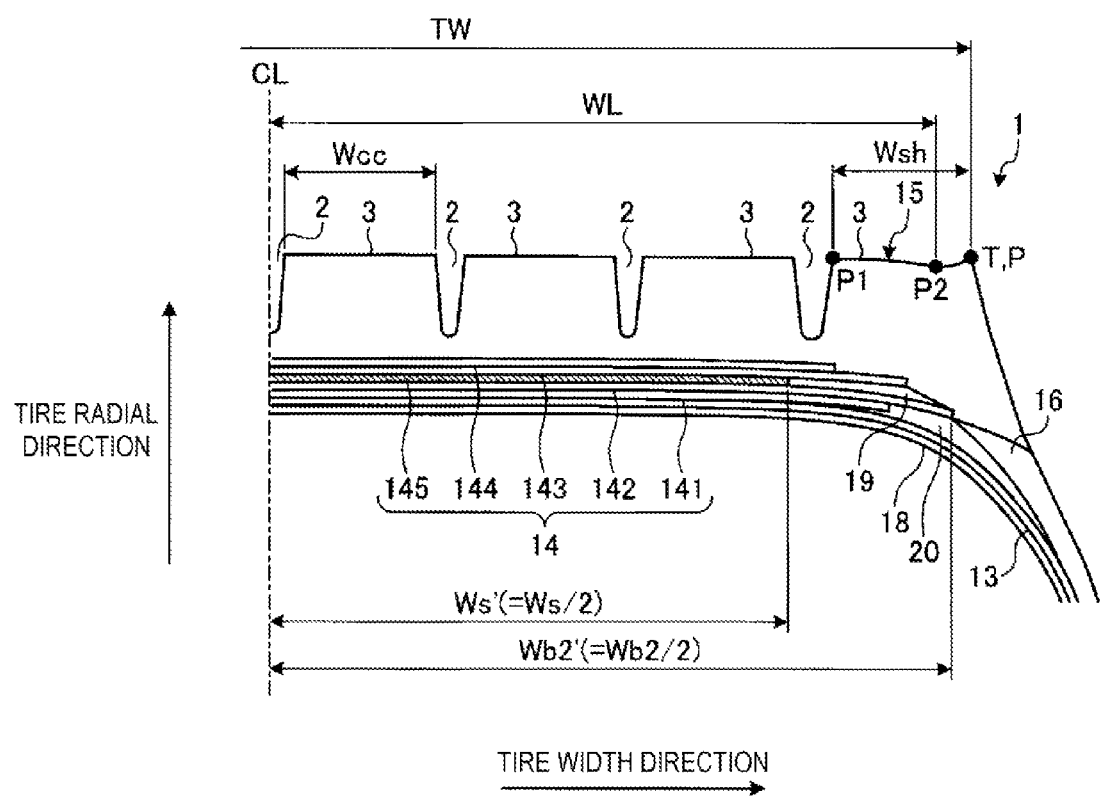
FIG. 5 is an explanatory view illustrating the pneumatic tire depicted in FIG. 1.

FIG. 5 is an explanatory view illustrating the pneumatic tire depicted in FIG. 1. This drawing is a duplicate of FIG. 2, differing in that the dimensions and reference signs depicted in FIG. 2 have been replaced and in that dimensions and reference signs required for explanation of the shoulder land portion 3 have been newly added.

As illustrated in FIG. 5, in the above-described configuration, a distance WL from the tire equatorial plane CL to the point P2 and a distance Ws' from the tire equatorial plane CL to the end portion of the circumferential reinforcing layer 145 preferably have a relationship such that $0.60 \leq Ws'/WL \leq 1.00$, and more preferably have a relationship such that $0.70 \leq Ws'/WL \leq 0.90$. As a result, the position of the point P2, which is a minimum diameter, is made appropriate.

The distance WL and the distance Ws' are each measured with the tire mounted on a standard rim and inflated to a regular inner pressure while being in an unloaded state. Here, in this pneumatic tire 1, the circumferential reinforcing layer 145 is disposed with left-right symmetry and is centered on the tire equatorial plane CL, and therefore the distance Ws' to the end portion of the circumferential reinforcing layer 145 is equal to the radius Ws/2 of the circumferential reinforcing layer 145.

In addition, in the above-described configuration, the distance WL from the tire equatorial plane CL to the point P2 and the width Wb2' from the tire equatorial plane CL to the end portion of a wide-width cross belt 142 preferably have a relationship such that $0.90 \leq Wb2'/WL \leq 1.30$ (see FIG. 5). As a result, the position of the point P2, which is a minimum diameter, is made appropriate.

The distance Wb2' is measured with the tire mounted on a standard rim and inflated to a regular inner pressure, while being in an unloaded state. Here, in this pneumatic tire 1, the wide-width cross belt 142 is disposed with left-right symmetry and is centered on the tire equatorial plane CL, and therefore the distance Wb2' at the end portion of the wide-width cross belt 142 is equal to the radius Wb2/2 of the wide-width cross belt 142.

Figure 6A:
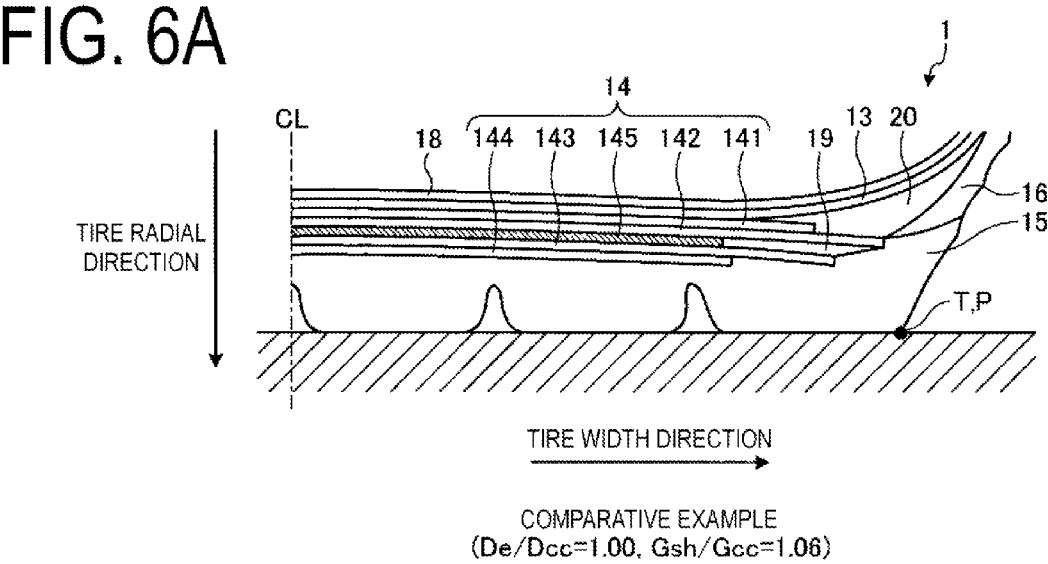
FIGS. 6A and 6B are explanatory views illustrating the effect of the pneumatic tire depicted in FIG. 1.
Figure 6B:
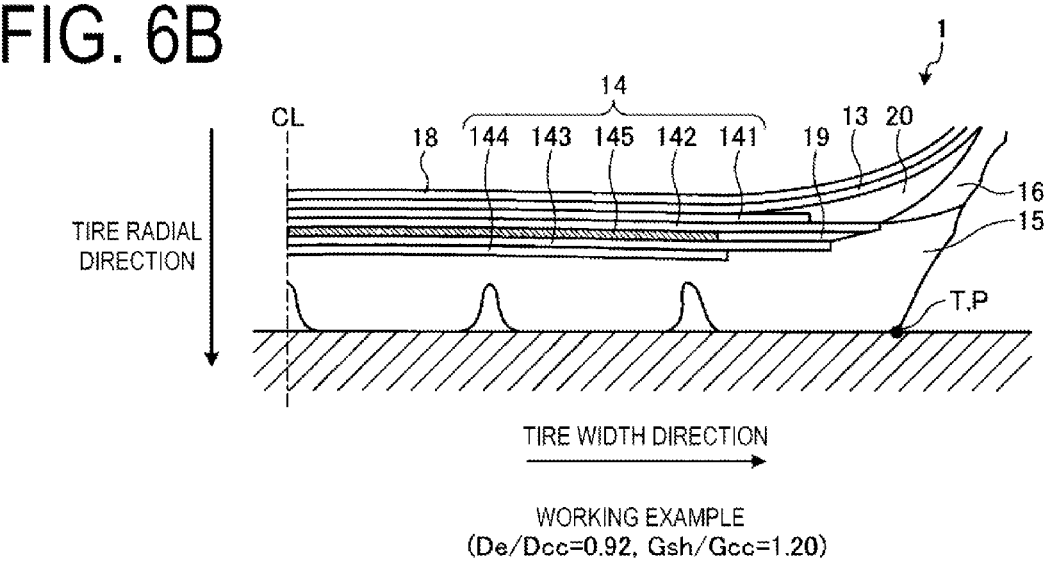

FIGS. 6A and 6B are explanatory views illustrating the effect of the pneumatic tire depicted in FIG. 1. In these drawings, the tire is depicted as having the ratio De/Dcc and the ratio Gsh/Gcc, which are different from each other, in a state of ground contact.

The tire of the comparative example in FIG. 6A has the configuration in FIGS. 1 to 3, with the ratio De/Dcc being set equally (De/Dcc=1.00) and the ratio Gsh/Gcc being set small (Gsh/Gcc=1.06). According to this configuration, in a state where the tire does not contact the ground, the tread profile has a shoulder-dropping shape (not illustrated in the drawings) in which the outer diameter decreases from the tire equatorial plane CL toward the tread edge P. For this reason, when the tire contacts the ground, then as illustrated in FIG. 6A, a large amount of deformation occurs on the road contact side of the shoulder region in the tread portion (the outer side in the tire radial direction). Here, the distances Dcc, De from the circumferential reinforcing layer 145 to the wear end surface WE are uniform (De/Dcc=1.00), and therefore the end portion of the circumferential reinforcing layer 145 is greatly distorted on the road contact side (the outer side in the tire radial direction) as the shoulder region of the tread portion is deformed. As a result, the strain on the circumferential reinforcing layer 145 when the tire contacts the ground is great.

In contrast, the tire of the working example in FIG. 6B has the configuration of FIGS. 1 to 3 with the ratio De/Dcc being set small (De/Dcc=0.92) and the ratio Gsh/Gcc being set large (Gsh/Gcc=1.20). According to this configuration, when the tire does not contact with the ground, there is a small difference in diameter between the outer diameter at the tire equatorial plane CL and the outer diameter at the tread edge P in the tread profile, with the tread profile having an overall shape that is flat (substantially planar along the tire rotational axis) (see FIG. 1 and FIG. 2). As a result, and as illustrated in FIG. 6B, the shoulder region of the tread portion when the tire contacts the ground experiences a small amount of deformation. Furthermore, the distances Dcc, De from the circumferential reinforcing layer 145 to the wear end surface WE have a relationship such that De<Dcc. Thus, when the tire contacts the ground, the circumferential reinforcing layer 145 has an overall flat shape when the end portion of the circumferential reinforcing layer 145 is distorted along with the deformation of the shoulder region of the tread portion. In this manner, the strain of the circumferential reinforcing layer 145 when the tire contacts the ground is reduced.

As described above, the configuration of FIG. 6B has, in comparison to the configuration of FIG. 6A, a small amount of deformation in the shoulder region of the tread portion, and a small amount of strain on the circumferential reinforcing layer 145, when the tire contacts the ground. As a result, the amount of slippage of the land portion 3 in the center region and the amount of slippage of the shoulder land portion when the tire contacts with the ground are averaged, which suppresses uneven wear of the shoulder land portion 3.

Furthermore, in the configuration of FIG. 6B, as illustrated in FIG. 4, the profile of the shoulder land portion 3 in the ground contact region includes a small-diameter portion (point P2 having the diameter D2 such that D2<D1 and D2<D3) between an edge portion (point P1) on the inner side in the tire width direction and the tire ground contact edge T. According to this configuration, the ground contact pressure on the side of the contact edge T of the shoulder land portion 3 when the tire contacts the ground increases. Also, the amount of slippage of the land portion 3 in the center region and the amount of slippage of the shoulder land portion 3 when the tire contacts the ground are averaged. As a result, uneven wear is effectively suppressed in the shoulder land portion 3.

Round Shaped Shoulder Portion

FIG. 7 is an explanatory view of a modified example of the pneumatic tire depicted in FIG. 1. FIG. 7 illustrates a configuration having a shoulder portion with a round shape.

In the configuration in FIG. 1, the shoulder portion has a square shape, in which the tire ground contact edge T and tread edge P are in accord, as illustrated in FIG. 2.

However, the shoulder portion is not limited as such, and may also have a round shape, as illustrated in FIG. 7. In such a case, an intersection P' is taken from the tread portion profile and the side wall portion profile in a cross-sectional view taken along the tire meridian direction, and the tread edge P is taken as the bottom of a perpendicular line drawn from the intersection P' to the shoulder portion. Therefore, the tire ground contact edge T and the tread edge P normally are in mutually different locations.

Additional Data

Additionally in the pneumatic tire 1, in FIG. 1, the tread width TW and the width Ws of the circumferential reinforcing layer 145 preferably have a relationship such that $0.70 \leq Ws/TW \leq 0.90$.

The tread width TW is a distance in the direction of the tire rotational axis between the left and right tread ends P, P measured when the tire is mounted on a standard rim, inflated to a regular inner pressure, and is in an unloaded state.

The width Ws of the circumferential reinforcing layer 145 is a distance between the left and right end portions of the circumferential reinforcing layer 145 in the tire rotational axis direction as measured when the tire is mounted on a standard rim, inflated to a regular inner pressure, and is in an unloaded state. In addition, in a situation where the circumferential reinforcing layer 145 has a configuration that is split along the tire width direction (not illustrated in the drawings), then the width Ws of the circumferential reinforcing layer 145 is the distance between the outermost end portions of each split portion.

Moreover, a typical pneumatic tire has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated in the drawings), the range of the ratio Ws/TW between the width Ws of the circumferential reinforcing layer 145 and the above-described tread width TW is stipulated by conversion to half width based on the tire equatorial plane CL. Specifically, the distance TW' (not illustrated in the drawings) from the tire equatorial plane CL to the tread edge P and the distance Ws' (not illustrated in the drawings) from the tire equatorial plane CL to the end portion of the circumferential reinforcing layer 145 are set so as to satisfy the relationship such that $0.70 \leq Ws'/TW' \leq 0.90$.

In addition, as illustrated in FIG. 1, the tread width TW and a total tire width SW preferably have a relationship such that $0.79 \leq TW/SW \leq 0.89$.

The total tire width SW refers to a linear distance (including all portions such as letters and patterns on the tire surface) between the side walls when the tire is mounted on a standard rim and inflated to a regular inner pressure and is in an unloaded state.

In addition, in FIG. 1 and FIG. 5, a ground contact width Wsh of each shoulder land portion 3 and the tread width TW preferably have a relationship such that $0.1 \leq Wsh/TW \leq 0.2$. This provides an appropriate ground contact width Wsh for the shoulder land portion 3.

The ground contact width is measured as a maximum linear distance in the tire axial direction of a contact surface between the tire and a flat plate, in a configuration where the tire is mounted on a standard rim and inflated to a regular inner pressure, placed perpendicularly to the flat plate while being in a static state, and has a load applied that corresponds to a regular load. In addition, in a configuration where the circumferential main groove 2 extends in a zigzag shape along the tire circumferential direction or in a configuration where the circumferential main groove 2 has a notched portion or a chamfered portion at an edge portion, the ground contact width is calculated as an average value of the entire circumference of the tire.

The ground contact width Wcc of the land portion 3 closest to the tire equatorial plane CL and the ground contact width Wsh of the shoulder land portion 3 have a relationship such that $0.90 \leq Wsh/Wcc \leq 1.30$ in the pneumatic tire 1 (see FIG. 5). This has the advantage of providing an appropriate ratio Wsh/Wcc. That is, given that $0.90 \leq Wsh/Wcc$, a ground contact patch pressure of the shoulder land portion 3 is properly secured and the uneven wear of the tire is suppressed. Conversely, despite the relationship satisfying $1.30 < Wsh/Wcc$, the resulting effect of increase in the ground contact pressure in the shoulder land portion 3 due to the increase in the ground contact width Wsh is small.

The land portion 3 closest to the tire equatorial plane CL refers, in a case where there is a land portion 3 on the tire equatorial plane CL, to this land portion 3, and, in a case where there is a circumferential main groove 2 on the tire equatorial plane CL, to the land portion 3 among the left and right land portions 3, 3 defined by this circumferential main groove 2 that is on the same side as the shoulder land portion 3 that is the object of comparison. For example, in a configuration having a left-right asymmetric tread pattern (not illustrated in the drawings), in a case where there is a circumferential main groove 2 on the tire equatorial plane CL, the ratio Wsh/Wcc between the ground contact width Wcc of the land portion 3 closest to the tire equatorial plane CL and the ground contact width Wsh of the shoulder land portion 3 is measured in a one-sided region bounded by the tire equatorial plane CL.

In addition, a diameter Ya at a maximum height position of the carcass layer 13, a diameter Yc at a maximum width position of the carcass layer 13, and a diameter Yd of the carcass layer 13 at the position of the end portion of the circumferential reinforcing layer 145 have relationships such that $0.80 \leq Yc/Ya \leq 0.90$ and $0.95 \leq Yd/Ya \leq 1.02$ in FIG. 1. As a result, the shape of the carcass layer 13 is made appropriate.

The diameter Ya at the maximum height position of the carcass layer 13 is measured as a distance from the tire rotational axis to the intersection of the tire equatorial plane CL and the carcass layer 13 when the tire is mounted on a standard rim, inflated to a regular inner pressure, and is in an unloaded state.

The diameter Yc of the maximum width position of the carcass layer 13 is measured as a distance from the tire rotational axis to the maximum width position of the carcass layer 13 when the tire is mounted on a standard rim, inflated to the regular inner pressure, and is in an unloaded state.

The diameter Yd of the carcass layer 13 at the end portion of the circumferential reinforcing layer 145 is measured as a distance from the tire rotational axis to a point Q3 (not illustrated in the drawings), where the point Q3 is the intersection of the carcass layer 13 and a straight line drawn in the tire radial direction from the end portion of the circumferential reinforcing layer 145, when the tire is mounted on a standard rim, inflated to a regular inner pressure, and is in an unloaded state.

In addition, the tread width TW and a cross-sectional width Wca of the carcass layer 13 preferably have a relationship such that $0.82 \leq TW/Wca \leq 0.92$.

The cross-sectional width Wca of the carcass layer 13 refers to a linear distance between the left and right maximum width positions of the carcass layer 13 when the tire is mounted on a standard rim and inflated to a regular inner pressure and is in an unloaded state.

In addition, in FIG. 3, the width Wb3 of the narrow-width cross belts 143 and the width Ws of the circumferential reinforcing layer 145 preferably have a relationship such that $0.75 \leq Ws/Wb3 \leq 0.90$. As a result, the width Ws of the circumferential direction reinforcing layer 145 is properly secured.

Also, as illustrated in FIG. 3, the circumferential reinforcing layer 145 is preferably disposed closer to the inner side in the tire width direction than the left and right edge portions of the narrow-width cross belt 143 among the pair of cross belts 142, 143. Additionally, the width Wb3 of the narrow-width cross belt 143 and a distance S from the edge portion of the circumferential reinforcing layer 145 to the edge portion of the narrow-width cross belt 143 is preferably in a range of $0.03 \leq S/Wb3 \leq 0.12$. As a result, the distance between the end portions of the width Wb3 of the cross belt 143 and the end portions of the circumferential reinforcing layer 145 are properly secured. This point is the same in situations where the circumferential reinforcing layer 145 has a split structure (not illustrated in the drawings).

The distance S of the circumferential reinforcing layer 145 is measured as a distance in the tire width direction when the tire is mounted on a standard rim, inflated to a regular inner pressure, and is in an unloaded state.

Furthermore, in the configuration of FIG. 1, the circumferential reinforcing layer 145 is constituted by a single steel wire wound in a spiral manner, as illustrated in FIG. 3. However, the configuration is not limited thereto, and the circumferential reinforcing layer 145 may also be configured by a plurality of wires wound spirally around side-by-side to each other (multiple winding structure). In this case, the number of wires is preferably five or less. Additionally, the width of winding per unit when five wires are wound in multiple layers is preferably not more than 12 mm. As a result, a plurality of wires (not less than two and not more than five wires) may be wound properly at a slant within a range of ±5° with respect to the tire circumferential direction.

Furthermore, in the pneumatic tire 1, the width Wb1 of the large-angle belt 141 and the width Wb3 of the narrow-width cross belt 143 among the pair of cross belts 142, 143 preferably have a relationship such that 0.85≤Wb1/Wb3≤1.05 (see FIG. 3). As a result, the ratio Wb1/Wb3 is made appropriate.

The width Wb1 of the large-angle belt 141 and the width Wb3 of the cross belt 143 are measured as the respective distances in the tire width direction when the tire is mounted on a standard rim, inflated to a regular inner pressure, and is in an unloaded state.

In the configuration of FIG. 1, the belt layer 14 has a structure with left-right symmetry centered on the tire equatorial plane CL as illustrated in FIG. 3, and the width Wb1 of the large-angle belt 141 and the width Wb3 of the narrow-width cross belt 143 have a relationship such that Wb1<Wb3. As a result, an edge portion of the large-angle belt 141 is disposed closer to the inner side in the tire width direction than the edge portion of the narrow-width cross belt 143 in a region on one side of the tire equatorial plane CL. However, the configuration is not limited thereto, and the width Wb1 of the large-angle belt 141 and the width Wb3 of the narrow-width cross belt 143 may have a relationship such that Wb1≥Wb3 (not illustrated in the drawings).

In addition, the belt cords of the large-angle belt 141 are steel wires. The large-angle belt 141 preferably has a quantity of ends that is not less than 15 ends/50 mm and not more than 25 ends/50 mm. Moreover, the belt cords of the pair of cross belts 142, 143 are constituted by steel wires, and the quantity of ends in the pair of cross belts 142, 143 is preferably not less than 18 ends/50 mm and not more than 28 ends/50 mm, and more preferably is not less than 20 ends/50 mm and not more than 25 ends/50 mm. Also, the belt cords that constitute the circumferential reinforcing layer 145 are steel wires, and the quantity of ends in the circumferential reinforcing layer 145 is preferably not less than 17 ends/50 mm and not more than 30 ends/50 mm. As a result, the respective strengths of the belt plies 141, 142, 143, 145 are properly secured.

In addition, a modulus E1 at 100% elongation of the coating rubber of the large-angle belt 141 and a modulus Es at 100% elongation of the coating rubber of the circumferential reinforcing layer 145 preferably have a relationship such that 0.90≤Es/E1≤1.10. Moreover, moduli E2, E3 at 100% elongation of the respective coating rubbers of the pair of cross belts 142, 143, and the modulus Es at 100% elongation of the coating rubber of the circumferential reinforcing layer 145 preferably have relationships such that 0.90≤Es/E2≤1.10 and 0.90≤Es/E3≤1.10. Moreover, the modulus Es at 100% elongation of the coating rubber of the circumferential reinforcing layer 145 is preferably within a range of 4.5 MPa≤Es≤7.5 MPa. As a result, the respective moduli of the belt plies 141, 142, 143, 145 are made appropriate.

The modulus at 100% elongation is measured in a tensile test at ambient temperature in conformity with JIS (Japan Industrial Standard)-K6251 (using dumbbell no. 3).

In addition, a breaking elongation $\lambda 1$ of the coating rubber of the large-angle belt 141 is preferably within a range of $\lambda 1 \geq 200\%$. Moreover, respective breaking elongations $\lambda 2$, $\lambda 3$ of the coating rubbers of the pair of cross belts 142, 143 are preferably in ranges of $\lambda 2 \geq 200\%$ and $\lambda 3 \geq 200\%$. Furthermore, a breaking elongation Xs of the coating rubber of the circumferential reinforcing layer 145 is preferably in a range of $\lambda s \geq 200\%$. As a result, the respective durability of the belt plies 141 142, 143, 145 is properly secured.

Breaking elongation is measured by performing a tensile test on a test sample of the JIS-K7162 specification 1B shape (dumbbell shape with a thickness of 3 mm) using a tensile tester (INSTRON5585H manufactured by Instron Corp.) conforming to JIS-K7161 at a pulling speed of 2 mm/min.

Elongation is preferably not less than 1.0% and not more than 2.5% when the tensile load of the belt cords as components that configure the circumferential reinforcing layer 145 is from 100 N to 300 N, and is preferably not less than 0.5% and not more than 2.0% when the tensile load is from 500 N to 1000 N as a tire (when removed from the tire). The belt cords (high elongation steel wire) have a better elongation ratio than normal steel wire when a low load is applied. The belt cords are thus able to withstand the loads that are applied to the circumferential reinforcing layer 145 during the time from manufacture until the tire is used, which is preferably in suppressing damage to the circumferential reinforcing layer 145.

The elongation of the belt cords is measured in accordance with JIS-G3510.

Additionally, in the pneumatic tire 1, the breaking elongation of the tread rubber 15 is preferably not less than 350%. As a result, the strength of the tread rubber 15 is secured and the occurrence of tears in the outermost circumferential main groove 2 is suppressed. Furthermore, the upper limit of the breaking elongation of the tread rubber 15 is not particularly limited. However, the upper limit is constrained by the type of rubber compound of the tread rubber 15.

Additionally, in this pneumatic tire 1, the hardness of the tread rubber 15 is preferably not less than 60. This secures an appropriate strength of the tread rubber 15. Furthermore, the upper limit of the hardness of the tread rubber 15 is not particularly limited. However, the upper limit is constrained by the type of rubber compound of the tread rubber 15.

Here, the term rubber hardness refers to JIS-A hardness in accordance with JIS-K6263.

In addition, in this pneumatic tire 1, a loss tangent tan δ of the tread rubber 15 is preferably within a range of 0.10≤tan δ.

The loss tangent tan δ is measured by using a viscoelastic spectrometer under conditions of a temperature of 20° C., a shearing strain of 10%, and a frequency of 20 Hz.

Belt Cushion

As illustrated in FIG. 2, the pneumatic tire 1 includes a belt cushion 20. The belt cushion 20 is disposed so as to be interposed between the carcass layer 13 and the end portion of the cross belt 142 on the inner side in the tire radial direction of the pair of cross belts 142, 143. For example, in the configuration in FIG. 2, an end portion of the belt cushion 20 on the outer side in the tire radial direction is inserted between the carcass layer 13 and the end portion of the cross belt 142, and abuts the edge portion of the large-angle belt 141. Additionally, the belt cushion 20 extends inward in the tire radial direction along the carcass layer 13 and is disposed so as to be interposed between the carcass layer 13 and a side wall rubber 16. Moreover, a pair of left and right belt cushions 20 is respectively disposed at the left and right side wall portions of the tire.

Additionally, a modulus Ebc at 100% elongation of the belt cushion 20 is within a range of 1.5 MPa≤Ebc≤3.0 MPa. Since the modulus Ebc of the belt cushion 20 satisfies such a range, the belt cushion 20 exhibits a stress relief effect, thereby suppressing separation of the periphery rubber at the end portions of the cross belt 142.

Moreover, a breaking elongation λbc of the belt cushion 20 is within a range of λbc≥400%. This secures an appropriate durability of the belt cushion 20.

Belt Edge Cushion Two-Color Structure]

Figure 8:
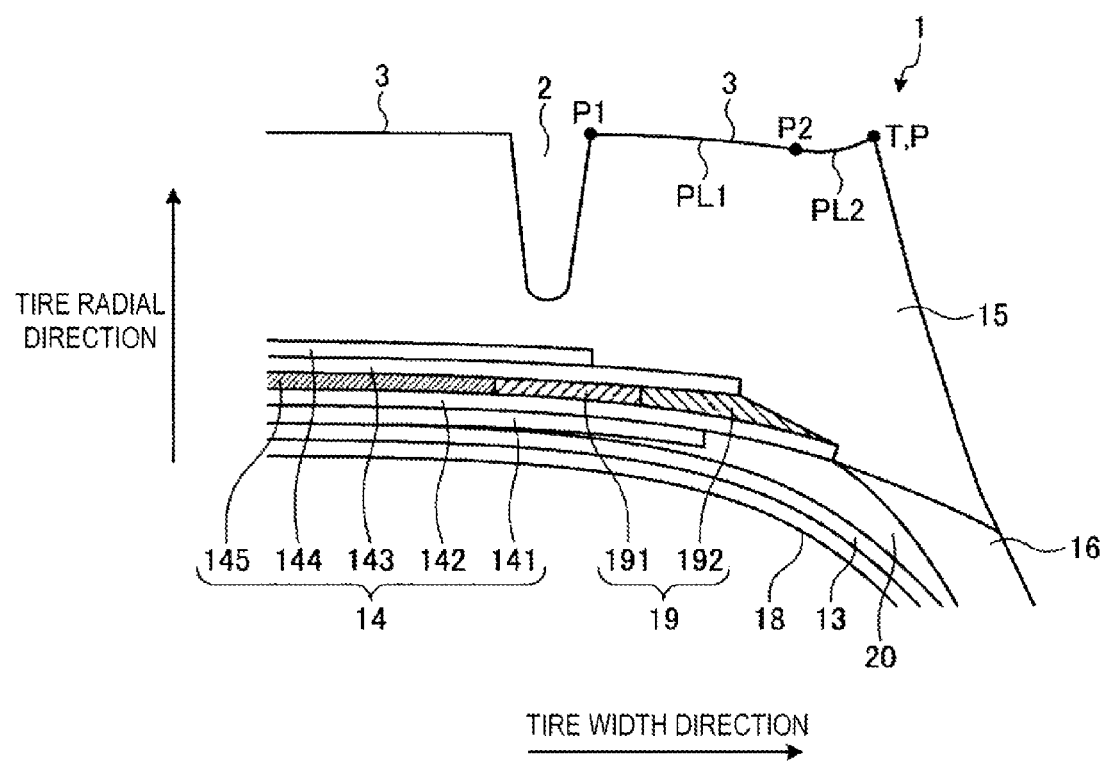
FIG. 8 is an explanatory view illustrating a modified example of the pneumatic tire depicted in FIG. 1.

FIG. 8 is an explanatory view illustrating a modified example of the pneumatic tire depicted in FIG. 1. FIG. 8 is an enlarged view of an end portion of the belt layer 14 on the outer side in the tire width direction. The circumferential reinforcing layer 145 and the belt edge cushion 19 in FIG. 8 are indicated by hatching.

In the configuration illustrated in FIG. 1, the circumferential reinforcing layer 145 is disposed closer to the inner side in the tire width direction than the left and right edges of the narrow-width cross belt 143 of the pair of cross belts 142, 143. A belt edge cushion 19 is disposed so as to be interposed between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than those of the coating rubber of the cross belts 142, 143. Specifically, the modulus E at 100% elongation of the belt edge cushion 19 and a modulus Eco of the coating rubber have a relationship such that 0.60≤E/Eco≤0.95. As a result, there is an advantage such that the occurrence of separation of rubber materials between the pair of cross belts 142, 143 in a region on the outer side in the tire width direction of the circumferential reinforcing layer 145 is suppressed.

Conversely, in the configuration illustrated in FIG. 8, the belt edge cushion 19 in the configuration in FIG. 1 has a two-color structure composed of a stress relief rubber 191 and an edge portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The edge portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, in a cross-sectional view taken along the tire meridian direction, the belt edge cushion 19 has a structure composed by disposing the stress relief rubber 191 and the edge portion relief rubber 192 side by side in the tire width direction to fill a region from the end portion of the circumferential reinforcing layer 145 on the outer side in the tire width direction to the end portion of the pair of cross belts 142, 143.

Additionally, a modulus Ein at 100% elongation of the stress relief rubber 191 and a modulus Es at 100% elongation of the coating rubber of the circumferential reinforcing layer 145 have a relationship such that Ein<Es in the configuration illustrated in FIG. 8. Specifically, the modulus Ein of the stress relief rubber 191 and the modulus Es of the circumferential reinforcing layer 145 preferably have a relationship such that 0.6≤Ein/Es≤0.9.

Moreover, a modulus Ein at 100% elongation of the stress relief rubber 191 and a modulus Eco at 100% elongation of the coating rubber of the cross belts 142, 143 have a relationship of Ein<Eco in the configuration illustrated in FIG. 8. Specifically, the modulus Ein of the stress relief rubber 191 and the modulus Eco of the coating rubber preferably have a relationship such that 0.6≤Ein/Eco≤0.9.

Additionally a modulus Eout at 100% elongation of the edge portion relief rubber 192 and the modulus Ein at 100% elongation of the stress relief rubber 191 preferably have a relationship such that Eout<Ein in the configuration illustrated in FIG. 8. Additionally, the modulus Ein at 100% elongation of the stress relief rubber 191 is preferably within a range of 4.0 MPa≤Ein≤5.5 MPa.

In the configuration illustrated FIG. 8, the stress relief rubber 191 is disposed on the outer side in the tire width direction of the circumferential reinforcing layer 145, and therefore shearing strain of the periphery rubber between the edge portion of the circumferential reinforcing layer 145 and the cross belts 142, 143 is alleviated. Moreover, since the edge portion relief rubber 192 is disposed at a position corresponding to the edge portions of the cross belts 142, 143, shearing strain of the periphery rubbers at the edge portions of the cross belts 142, 143 is alleviated. Accordingly, separation of the periphery rubber of the circumferential reinforcing layer 145 is suppressed.

Effects

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). In addition, the pneumatic tire 1 includes at least three circumferential main grooves 2 that extend in the tire circumferential direction, and a plurality of land portions 3 that are partitioned and formed by these circumferential main grooves 2. Also, the belt layer 14 is formed by laminating the pair of cross belts 142, 143 each having a belt angle of not less than 10° and not more than 45° as an absolute value and having belt angles of mutually opposite signs, and the circumferential reinforcing layer 145 having a belt angle within a range of ±5° with respect to the tire circumferential direction (see FIG. 2). In addition, in a cross-sectional view taken along the tire meridian direction, a diameter D1 at a point P1 at an edge portion on the inner side of a shoulder land portion 3 in the tire width direction, a diameter D2 at a predetermined point P2 within the ground-contact surface of the shoulder land portion 3, and a diameter D3 at the tire ground contact edge T of the tire have relationships such that D2<D1 and D2<D3 (see FIG. 4).

According to this configuration, the profile of the shoulder land portion 3 in the ground contact region includes a small-diameter portion (point P2 having the diameter D2 where D2<D1 and D2<D3) between the edge portion (point P1) on the inner side in the tire width direction and the tire ground contact edge T. According to this configuration, the ground contact pressure when the tire contacts the ground increases on the side of the ground contact edge T of the shoulder land portion 3. Also, the amount of slippage of the center region of the land portion 3 and the amount of slippage of the shoulder land portion 3 when the tire contacts the ground are averaged. As a result, this has the advantage in that the uneven wear of the shoulder land portion 3 is effectively suppressed.

In addition, in this pneumatic tire 1, the shoulder land portion 3 in a cross-sectional view taken along the tire meridian direction has a first profile PL1 in a segment from the point P1 to the point P2 that protrudes toward the outer side in the tire radial direction, and a second profile PL2 in a segment from the point P2 to the tire ground contact edge T that protrudes toward the inner side in the tire radial direction (see FIG. 4). As a result, there is an advantage in that the ground contact shape of the shoulder land portion 3 is made appropriate, and in that uneven wear is suppressed in the shoulder land portion 3.

In addition, in the pneumatic tire 1, in a cross-sectional view taken along the tire meridian direction, when a line is drawn along the wear end surface WE of the circumferential main groove 2, the distance Dcc from the circumferential reinforcing layer 145 to the wear end surface WE and the distance De from the end portion of the circumferential reinforcing layer 145 to the wear end surface WE, in the tire equatorial plane CL, have a relationship such that De/Dcc≤0.94 (see FIG. 2). According to this configuration, since the distances Dcc, De of the circumferential reinforcing layer 145 with respect to the wear end surface WE is made appropriate, the strain on the circumferential reinforcing layer 145 when the tire contacts the ground is reduced (compare FIGS. 6A and 6B). Accordingly, there is an advantage in that separation of the peripheral rubber of the circumferential reinforcing layer 145 is suppressed.

In addition, in this pneumatic tire 1, the distance Gcc from the tread profile to the tire inner circumferential surface and the distance Gsh from the tread edge P to the tire inner circumferential surface in the tire equatorial plane CL have a relationship such that 1.10≤Gsh/Gcc (see FIG. 2). According to this configuration, the tread profile has an overall flat shape when the tire does not contact the ground (see FIG. 1 and FIG. 2). As such, the amount of deformation in the shoulder region of the tread portion when the tire contacts the ground is reduced (compare FIGS. 6A and 6B). Accordingly, there is an advantage in that separation of the peripheral rubber of the circumferential reinforcing layer 145 is effectively suppressed. In addition, there is an advantage in that repeating strain at the end portion of the circumferential reinforcing layer 145 while the tire is rolling is reduced, and in that failure of the belt cords of the circumferential reinforcing layer 145 is suppressed.

Also, in this pneumatic tire 1, the length AR1 (not illustrated in the drawings) of the first profile PL1 and the length AR2 (not illustrated in the drawings) of the second profile PL2 have a relationship such that 0.10≤AR2/(AR1+AR2)≤0.50 (see FIG. 4). According to this configuration, the proportions of the length AR1 of the first profile PL1 and the length AR2 of the second profile PL2 are made appropriate, and the stiffness of the shoulder land portion 3 is reinforced. As a result, there is an advantage in that uneven wear is suppressed in the shoulder land portion 3.

In addition, in this pneumatic tire 1, the diameter D1 at the point P1, the diameter D2 at the point P2, and the diameter D3 at the tire ground contact edge T have a relationship such that 0.30≤(D1−D2)/(D3−D2)≤0.70 (see FIG. 4). According to this configuration, the relationship between the shoulder dropping amount D1−D2 of the shoulder land portion 3 in the first profile PL1 and the shoulder dropping amount of D3−D2 of the shoulder land portion 3 in the second profile PL2 is made appropriate. As a result, there is an advantage in that the stiffness is reinforced on the side of the tire ground contact edge T of the shoulder land portion 3, and uneven wear of the shoulder land portion 3 is suppressed.

In addition, in this pneumatic tire 1, the distance WL from the tire equatorial plane CL to the point P2 and the distance Ws' from the tire equatorial plane CL to the end portion of the circumferential reinforcing layer 145 have a relationship such that 0.60≤Ws'/WL≤1.00 (see FIG. 5). As a result, there is an advantage in that the position of the point P2, which is a smallest-diameter, is made appropriate, and uneven wear of the shoulder land portion 3 is suppressed.

In addition, in this pneumatic tire 1, the distance WL from the tire equatorial plane CL to the point P2 and the distance Wb2' from the tire equatorial plane CL to the end portion of the wide-width cross belt 143 have a relationship such that 0.90≤Wb2'/WL≤1.30 (see FIG. 5). As a result, there is an advantage in that the position of the point P2, which is a smallest-diameter, is made appropriate, and uneven wear of the shoulder land portion 3 is suppressed.

In addition, in this pneumatic tire 1, the ground contact width Wsh of the shoulder land portion 3 and the tread width TW have a relationship such that 0.1≤Wsh/TW≤0.2 (see FIG. 1 and FIG. 5). With such a configuration, there is an advantage in that the ground contact width Wsh of the shoulder land portion 3 is made appropriate. That is, satisfying the relationship such that 0.1≤Wsh/TW ensures the ground contact surface area of the shoulder land portion 3 and uneven wear resistance of the tire. Also, satisfying the relationship such that Wsh/TW≤0.2 increases the ground contact patch pressure of the shoulder land portion 3 when the tire contacts the ground, which leads to an improvement in the wet performance of the tire.

In addition, in this pneumatic tire 1, the tread width TW and the total tire width SW have a relationship such that 0.79≤TW/SW≤0.89 (see FIG. 1). According to this configuration, since the ratio TW/SW is within the above-described range, radial growth of the left and right shoulder portions is suppressed. Consequently, a difference in radial growth between the center region and the shoulder region is alleviated and the ground contact pressure distribution of the tire is made uniform. This provides an advantage in that the uneven wear resistance of the tire is increased. Specifically, satisfying the relationship such that 0.79≤TW/SW reduces an average ground contact pressure. Moreover, satisfying the relationship such that TW/SW≤0.89 suppresses rising of the shoulder portion and deformation in the ground contact shape.

Additionally, in this pneumatic tire 1, the tread width TW and a cross-sectional width Wca of the carcass layer 13 have a relationship such that 0.82≤TW/Wca≤0.92 (see FIG. 1). In such a configuration, radial growth in the center region is suppressed due to the belt layer 14 having the circumferential reinforcing layer 145. Furthermore, since the ratio TW/Wca is within the above-described range, a difference in radial growth between the center region and a shoulder region is alleviated and the ground contact pressure distribution in the tire width direction is made uniform. This has the advantage of making the ground contact pressure distribution of the tire uniform. Specifically, satisfying the relationship such that 0.82≤TW/Wca ensures the air volume inside the tire and suppresses deformation. Moreover, satisfying the relationship such that TW/Wca≤0.92 suppresses rising of the shoulder portion, which in turn makes the ground contact pressure distribution uniform.

In addition, in this pneumatic tire 1, the ground contact width Wcc of the land portion 3 closest to the tire equatorial plane CL and the ground contact width Wsh of the shoulder land portion 3 have the relationship satisfying such that 0.90≤Wsh/Wcc≤1.30 (see FIG. 5). This has the advantage of providing an appropriate ratio Wsh/Wcc. That is, satisfying the relationship such that 0.90≤Wsh/Wcc properly ensures the ground contact patch pressure of the shoulder land portion 3 and suppresses the uneven wear resistance of the tire. Conversely, despite situations where 1.30<Wsh/Wcc, the effect of increase in the ground contact patch pressure in the shoulder land portion 3 due to the increase in the ground contact width Wsh remains small.

In addition, in the pneumatic tire 1, the diameter Ya at the maximum height position of the carcass layer 13 and the diameter Yc at the maximum width position of the carcass layer 13 have a relationship such that 0.80≤Yc/Ya≤0.90 (see FIG. 1). As a result, there is an advantage in that the shape of the carcass layer 13 is made appropriate.

Additionally, in the pneumatic tire 1, the diameter Ya at the maximum height position of the carcass layer 13 and the diameter Yd of the carcass layer 13 at the end portion of the circumferential reinforcing layer 145 have a relationship such that 0.95≤Yd/Ya≤1.02 (see FIG. 1). Accordingly, there is an advantage in that the shape of the carcass layer 13 is made appropriate, and deformation of the carcass layer 13 is reduced in the disposition region of the circumferential reinforcing layer 145 when the tire contacts the ground. That is, satisfying the relationship such that 0.95≤Yd/Ya reduces the amount of deformation in the carcass layer 13 in the disposition region of the circumferential reinforcing layer 145 when the tire contacts the ground. In addition, satisfying the relationship such that Yd/Ya≤1.02 properly ensures the tire shape.

Furthermore, in the pneumatic tire 1, the belt layer 14 includes the large-angle belt 141 having a belt angle of not less than 45° and not more than 70° as an absolute value (see FIG. 1 and FIG. 3). As a result, there is an advantage in that the belt layer 14 is reinforced and the strain of the end portions of the belt layer 14 when the tire contacts the ground is suppressed.

In addition, in this pneumatic tire 1, the belt cords of the large-angle belt 141 are steel wires, and the quantity of ends in the large-angle belt 141 is not less than 15 ends/50 mm and not more than 25 ends/50 mm (see FIG. 1 and FIG. 3). As a result, there is an advantage in that the quantity of ends of the belt cords of the large-angle belt 141 is made appropriate. That is, given that the quantity of ends is at least 15 ends/50 mm, the strength of the large-angle belt 141 is properly secured. In addition, given that the quantity of ends is at most 25 ends/50 mm, the amount of rubber in the coating rubber of the large-angle belt 141 is properly secured, and separation of the rubber material between neighboring belt plies (in FIG. 3, between the carcass layer 13 and the cross belt 142 that is on the inner side in the tire radial direction, and the large-angle belt 141) is suppressed.

In addition, in this pneumatic tire 1, the belt cords of the cross belts 142, 143, are steel wires, and the quantity of ends is not less than 18 ends/50 mm and not more than 28 ends/50 mm. As a result, this has an advantage in that the quantity of end portions in the belt cords of the cross belts 142, 143 is made appropriate. That is, given that the quantity of ends is at least 18 ends/50 mm, the strength of the cross belts 142, 143 is properly secured. In addition, given that the quantity of ends is at most 28 ends/50 mm, the amount of rubber in the coating rubber of the cross belts 142, 143 is properly secured, and separation of the rubber material between neighboring belt plies is suppressed.

In addition, in the pneumatic tire 1, the rubber hardness of the tread rubber 15 is not less than 60. As a result, there is an advantage in that the strength of the tread rubber 15 is properly secured, and the uneven wear resistance performance of the tire is improved.

Also, in the pneumatic tire 1, the belt cords of the circumferential reinforcing layer 145 are steel wire, and the circumferential reinforcing layer 145 has a quantity of ends that is not less than 17 ends/50 mm and not more than 30 ends/50 mm. As a result, there is an advantage in that the quantity of ends of the belt cords of the circumferential reinforcing layer 145 is made appropriate. That is, given that the quantity of ends is at least 17 ends/50 mm, the strength of the circumferential reinforcing layer 145 is properly secured. In addition, given that the quantity of ends is at most 30 ends/50 mm, the amount of rubber in the coating rubber of the circumferential reinforcing layer 145 is properly secured, and separation of the rubber material between neighboring belt plies (In FIG. 3, between the pair of cross belts 142, 143 and the circumferential reinforcing layer 145) is suppressed.

In addition, in the pneumatic tire 1, the elongation is not less than 1.0% and not more than 2.5% when the tensile load of the belt cords as components that configure the circumferential reinforcing layer 145 is from 100 N to 300 N. As a result, there is an advantage in that the effect of suppressing radial growth in the center region is properly secured due to the circumferential reinforcing layer 145.

In addition, in the pneumatic tire 1, the elongation is not less than 0.5% and not more than 2.0% when the tensile load of the belt cords as tire components that constitute the circumferential reinforcing layer 145 is from 500 N to 1000 N. As a result, there is an advantage in that the effect of suppressing radial growth in the center region is properly secured due to the circumferential reinforcing layer 145.

In addition, in the pneumatic tire 1, the circumferential reinforcing layer 145 is disposed closer to the inner side in the tire width direction than the left and right edge portions of the narrow-width cross belt 143 of the pair of cross belts 142, 143 (see FIG. 3). Also, the pneumatic tire 1 includes the stress relief rubber 191 disposed between the pair of cross belts 142, 143 and on the outer side of the circumferential reinforcing layer 145 in the tire width direction so as to be adjacent to the circumferential reinforcing layer 145, and the edge portion relief rubber 192 disposed between the pair of cross belts 142, 143 and on the outer side of the stress relief rubber 191 in the tire width direction and at a position corresponding to the edge portion of the pair of cross belts 142, 143 so as to be adjacent to the stress relief rubber 191 (see FIG. 7). In such a configuration, there is an advantage in that fatigue failure of the peripheral rubber at the edge portion of the circumferential reinforcing layer 145 is suppressed due to the circumferential reinforcing layer 145 being disposed closer to the inner side in the tire width direction than the left and right edge portions of the narrow-width cross belt 143 of the pair of cross belts 142, 143. Given that the stress relief rubber 191 is disposed on the outer side of the circumferential reinforcing layer 145 in the tire width direction, shearing strain of the peripheral rubber between the edge portion of the circumferential reinforcing layer 145 and the cross belts 142, 143 is alleviated. Moreover, since the edge portion relief rubber 192 is disposed at a position corresponding to the edge portions of the cross belts 142, 143, shearing strain of the peripheral rubbers at the edge portions of the cross belts 142, 143 is alleviated.

Accordingly, there is an advantage in that separation of the peripheral rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts 142, 143 have a relationship such that Ein<Eco. As a result, there is an advantage in that the modulus Ein of the stress relief rubber 191 is made appropriate and the shearing strain of the peripheral rubber between the edge portion of the circumferential reinforcing layer 145 and the cross belts 142, 143 is alleviated.

Furthermore, in the pneumatic tire 1, the modulus Ein at 100% elongation of the stress relief rubber 191 and the modulus Eco at 100% elongation of the coating rubber of the pair of cross belts 142, 143 have a relationship such that 0.6≤Ein/Eco≤0.9. As a result, there is an advantage in that the ratio Ein/Eco is made appropriate and the shearing strain of the peripheral rubber between the edge portion of the circumferential reinforcing layer 145 and the cross belts 142, 143 is alleviated.

Additionally, in the pneumatic tire 1, the modulus Ein at 100% elongation of the stress relief rubber 191 is within a range of 4.0 MPa≤Ein≤5.5 MPa (see FIG. 7). As a result, there is an advantage in that the modulus Ein of the stress relief rubber 191 is made appropriate and the shearing strain of the peripheral rubber between the edge portion of the circumferential reinforcing layer 145 and the cross belts 142, 143 is alleviated.

In the pneumatic tire 1, the circumferential reinforcing layer 145 is disposed closest to the inner side in the tire width direction than the left and right edges of the narrow-width cross belt 143 of the pair of cross belts 142, 143 (see FIG. 3). Also, the width Wb3 of the narrow-width cross belt 143 and the distance S from the edge portion of the circumferential reinforcing layer 145 to the edge portion of the narrow-width cross belt 143 are in a range of 0.03≤S/Wb3≤0.12. This has the advantage of providing an appropriate positional relationship S/Wb3 between the edge portions of the cross belts 142, 143 and the edge portions of the circumferential reinforcing layer 145. Specifically, given that 0.03≤S/Wb3, an appropriate distance is ensured between the end portions of the circumferential reinforcing layer 145 and the end portions of the cross belt 143 to suppress the separation of the peripheral rubbers at the end portions of these belt plies 145, 143. Additionally, given that S/Wb3≤0.12, the width Ws of the circumferential reinforcing layer 145 relative to the width Wb3 of the cross belt 143 is secured and an appropriate hoop effect is also ensured by the circumferential reinforcing layer 145.

Target of Application

In addition, the pneumatic tire 1 is preferably applied to a heavy duty tire with an aspect ratio of not less than 40% and not more than 70% when the tire is mounted on a standard rim, inflated to a regular inner pressure, and applied with a regular load. A heavy duty tire has a higher load under use than a passenger car tire. As a result, the difference in the diameters between the disposition region of the circumferential reinforcing layer 145 in the tread surface and the region on the outer side in the tire width direction from the circumferential reinforcing layer 145 may easily increase. Moreover, a ground contact shape having an hourglass shape occurs easily in the tire having the above-mentioned low aspect ratio. As such, given that the heavy-duty tire is made the target of application, the above-described effect of improving the uneven wear resistance performance of the tire is remarkably obtained.

Examples

FIGS. 9A to 12B are tables showing results of performance testing of pneumatic tires according to embodiments of the present technology.

In the performance testing, a plurality of pneumatic tires that differ from each other were evaluated as belt-edge-separation resistance performance (see FIGS. 9A to 12B). In the evaluation, pneumatic tires having a tire size of 315/60 R22.5 were mounted on a rim having a rim size of 22.5×9.00 and inflated with 900 kPa of air pressure. In addition, the pneumatic tires were mounted on the front axle of a testing vehicle that is a 4×2 tractor trailer, and a load of 34.81 kN was applied. Then, after driving the testing vehicle for 100,000 km, the amount of shoulder-dropping wear on the shoulder land portion (difference between the amount of wear on the edge portion of the shoulder land portion and the amount of wear on the outermost circumferential main groove) was measured and evaluated. A larger numerical value is preferable in the evaluations. Specifically, an evaluation of not less than 105 (not less than +5 points over the standard value of 100) indicates sufficient superiority over the conventional example, and an evaluation of not less than 110 indicates dramatic superiority over the conventional example.

The pneumatic tires 1 of Working Example 1 have the configuration described in FIGS. 1 to 3. In addition, the belt angle of the cross belts 142, 143 is ±19°, and the belt angle of the circumferential reinforcing layer 145 is substantially 0°. Furthermore, the main dimensions are TW=275 mm, Gcc=32.8 mm, Dcc=11.2 mm, Hcc=21.3 mm, Ya=446 mm, D1>D2, and D1>D3. The pneumatic tires 1 in each of Working Examples 2 to 50 are modified examples of the pneumatic tires of Working Example 1.

The conventional pneumatic tire does not include the circumferential reinforcing layer 145 in the configuration of FIGS. 1 to 3.

As indicated by the testing results, the pneumatic tires 1 of each Working Examples 1 to 50 clearly provided improved uneven wear resistance performance of the tire. In addition, when compared between Working Examples 1 to 9, an advantageous effect (an evaluation of not less than 105) on the uneven wear resistance performance is obtained by satisfying the relationships such that 1.20≤Gsh/Gcc, De/Dcc≤0.92, D2<D1, and D2<D3.

What is claimed is:

1. A pneumatic tire comprising:
   a carcass layer;
   a belt layer disposed on an outer side of the carcass layer in a tire radial direction;
   a tread rubber disposed on an outer side of the belt layer in the tire radial direction;
   at least three circumferential main grooves extending in a tire circumferential direction; and
   a plurality of land portions partitioned and formed by the circumferential main grooves,
   the belt layer being formed by laminating a pair of cross belts each having a belt angle of not less than 10° and not more than 45° as an absolute value and having mutually opposite signs, and a circumferential reinforcing layer having a belt angle within a range of ±5° with respect to the tire circumferential direction,
   among the circumferential main grooves, left and right circumferential main grooves on an outermost side in a tire width direction being referred to as an outermost circumferential main groove, and a land portion closer to an outer side in the tire width direction than the left and right circumferential main grooves on the outermost side being referred to as a shoulder land portion, and in a cross-sectional view taken along a tire meridian direction, a diameter D1 at a point P1 on an edge portion on an inner side of the shoulder land portion in the tire width direction, a diameter D2 at a predetermined point P2 within a ground-contact surface of the shoulder land portion, and a diameter D3 of a tire ground contact edge T having a relationship such that D2<D1 and D2<D3; wherein the diameter D1 at the point P1, the diameter D2 at the point P2, and the diameter D3 at the tire ground contact edge T have a relationship such that 0.30≤(D1−D2)/(D3−D2)≤0.70, and a first profile extends from the point P1 to P2 and conforms with a line extending from a profile of the land portion from the outermost circumferential main groove to an inner side in the tire width direction.

2. The pneumatic tire according to claim 1, wherein, upon a wear end surface WE of the circumferential main grooves being drawn in the cross-sectional view taken along the tire meridian direction, a distance Dcc on a tire equatorial plane from the circumferential reinforcing layer to the wear end surface WE and a distance De from an end portion of the circumferential reinforcing layer to the wear end surface WE have a relationship such that De/Dcc≤0.94.

3. The pneumatic tire according to claim 1, wherein a distance Gcc on a tire equatorial plane from a tread profile to a tire inner circumferential surface and a distance Gsh from a tread edge to the tire inner circumferential surface have a relationship such that 1.10≤Gsh/Gcc.

4. The pneumatic tire according to claim 1, wherein a distance WL from a tire equatorial plane to the point P2 and a distance Ws' from the tire equatorial plane to an end portion of the circumferential reinforcing layer have a relationship such that 0.60≤Ws'/WL≤1.00.

5. The pneumatic tire according to claim 1, wherein a distance WL from a tire equatorial plane to the point P2 and a width Wb2' from the tire equatorial plane to an end portion of a wider-width cross belt of the pair of cross belts have a relationship such that 0.90≤Wb2'/WL≤1.30.

6. The pneumatic tire according to claim 1, wherein a ground contact width Wsh of the shoulder land portion and a tread width TW have a relationship such that 0.1≤Wsh/TW≤0.2.

7. The pneumatic tire according to claim 1, wherein a tread width TW and a cross-sectional width Wca of the carcass layer have a relationship such that 0.82≤TW/Wca≤0.92.

8. The pneumatic tire according to claim 1, wherein a ground contact width Wcc of a land portion that is closest to a tire equatorial plane and a ground contact width Wsh of the shoulder land portion have a relationship such that 0.90≤Wsh/Wcc≤1.30.

9. The pneumatic tire according to claim 1, wherein a diameter Ya at a maximum height position of the carcass layer and a diameter Yc at a maximum width position of the carcass layer have a relationship such that 0.80≤Yc/Ya≤0.90.

10. The pneumatic tire according to claim 1, wherein a diameter Ya at a maximum height position of the carcass layer and a diameter Yd of the carcass layer at a position on an end portion of the circumferential reinforcing layer have a relationship such that 0.95≤Yd/Ya≤1.02.

11. The pneumatic tire according to claim 1, wherein the belt layer has a large-angle belt having a belt angle of not less than 45° and not more than 70° as an absolute value.

12. The pneumatic tire according to claim 11, wherein belt cords of the large-angle belt are steel wires, and the large-angle belt has a quantity of ends that is not less than 15 ends/50 mm and not more than 25 ends/50 mm.

13. The pneumatic tire according to claim 1, wherein belt cords of the cross belts are steel wires, and have a quantity of ends that is not less than 18 ends/50 mm and not more than 28 ends/50 mm.

14. The pneumatic tire according to claim 1, wherein a rubber hardness of the tread rubber is not less than 60.

15. The pneumatic tire according to claim 1, wherein belt cords of the circumferential reinforcing layer are steel wires, and have a quantity of ends that is not less than 17 ends/50 mm and not more than 30 ends/50 mm.

16. The pneumatic tire according to claim 1, wherein elongation of belt cords that configure the circumferential reinforcing layer when the belt cords are components and a tensile load is from 100 N to 300 N is not less than 1.0% and not more than 2.5%.

17. The pneumatic tire according to claim 1, wherein elongation of belt cords that configure the circumferential reinforcing layer when the belt cords are tire components and a tensile load is from 500 N to 1000 N is not less than 0.5% and not more than 2.0%.

18. The pneumatic tire according to claim 1, wherein the circumferential reinforcing layer is disposed closer to an inner side in the tire width direction than left and right edge portions of a narrow-width cross belt of the pair of cross belts, the pneumatic tire further comprising:

a stress relief rubber disposed between the pair of cross belts and disposed on an outer side of the circumferential reinforcing layer in the tire width direction so as to be adjacent to the circumferential reinforcing layer; and an edge portion relief rubber disposed between the pair of cross belts and disposed on an outer side of the stress relief rubber in the tire width direction and at a position corresponding to the edge portions of the pair of cross belts so as to be adjacent to the stress relief rubber.

19. The pneumatic tire according to claim 18, wherein a modulus Ein at 100% elongation of the stress relief rubber and a modulus Eco at 100% elongation of coating rubber of the pair of cross belts have a relationship such that Ein<Eco.

20. The pneumatic tire according to claim 18, wherein a modulus Ein at 100% elongation of the stress relief rubber and a modulus Eco at 100% elongation of coating rubber of the pair of cross belts have a relationship such that 0.6≤Ein/Eco≤0.9.

21. The pneumatic tire according to claim 18, wherein a modulus Ein at 100% elongation of the stress relief rubber is within a range of 4.0 MPa≤Ein≤5.5 MPa.

22. The pneumatic tire according to claim 1, wherein the circumferential reinforcing layer is disposed closer to the inner side in the tire width direction than left and right edge portions of a narrower-width cross belt of the pair of cross belts, and a width Wb3 of the narrower-width cross belt and a distance S from the edge portion of the circumferential reinforcing layer to the edge portion of the narrower-width cross belt are in a range of 0.03≤S/Wb3.

23. The pneumatic tire according to claim 1 applied to a heavy duty tire having an aspect ratio of not more than 70%.

24. The pneumatic tire according to claim 1, wherein in the cross-sectional view taken along the tire meridian direction, the shoulder land portion has the first profile extending from the point P1 to the point P2, and having an arcuate shape protruding toward an outer side in the tire radial direction, and has a second profile extending from the point P2 to the tire ground contact edge T, and having an arcuate shape protruding toward an inner side in the tire radial direction.

25. The pneumatic tire according to claim 24, wherein a length AR1 of the first profile and a length AR2 of the second profile have a relationship such that $0.10 \leq AR2/(AR1+AR2) \leq 0.40$.

26. The pneumatic tire according to claim 1, wherein a tread width TW and a total tire width SW have a relationship such that $0.79 \leq TW/SW \leq 0.85$.

27. A pneumatic tire comprising:
   a carcass layer;
   a belt layer disposed on an outer side of the carcass layer in a tire radial direction;
   a tread rubber disposed on an outer side of the belt layer in the tire radial direction;
   at least three circumferential main grooves extending in a tire circumferential direction; and
   a plurality of land portions partitioned and formed by the circumferential main grooves,
   the belt layer being formed by laminating a pair of cross belts each having a belt angle of not less than 10° and not more than 45° as an absolute value and having mutually opposite signs, and a circumferential reinforcing layer having a belt angle within a range of ±5° with respect to the tire circumferential direction,
   among the circumferential main grooves, left and right circumferential main grooves on an outermost side in a tire width direction being referred to as an outermost circumferential main groove, and a land portion closer to an outer side in the tire width direction than the left and right circumferential main grooves on the outermost side being referred to as a shoulder land portion, and
   in a cross-sectional view taken along a tire meridian direction, a diameter D1 at a point P1 on an edge portion on an inner side of the shoulder land portion in the tire width direction, a diameter D2 at a predetermined point P2 within a ground-contact surface of the shoulder land portion, and a diameter D3 of a tire ground contact edge T having a relationship such that D2<D1 and D2<D3,
   wherein in the cross-sectional view taken along the tire meridian direction, the shoulder land portion has a first profile extending from the point P1 to the point P2 and having an arcuate shape protruding toward an outer side in the tire radial direction, and has a second profile extending from the point P2 to the tire ground contact edge T and having an arcuate shape protruding toward an inner side in the tire radial direction.

28. The pneumatic tire according to claim 27, wherein a length AR1 of the first profile and a length AR2 of the second profile have a relationship such that $0.10 \leq AR2/(AR1+AR2) \leq 0.40$.

* * * * *